United States Patent
Horiuchi et al.

(10) Patent No.: US 9,715,189 B2
(45) Date of Patent: Jul. 25, 2017

(54) IMAGE FORMING APPARATUS

(71) Applicant: CANON KABUSHIKI KAISHA, Tokyo (JP)

(72) Inventors: Izuru Horiuchi, Tokyo (JP); Yasutomo Furuta, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/222,687

(22) Filed: Jul. 28, 2016

(65) Prior Publication Data
US 2017/0038703 A1 Feb. 9, 2017

(30) Foreign Application Priority Data

Aug. 5, 2015 (JP) ................................. 2015-155194

(51) Int. Cl.
G03G 15/00 (2006.01)
G03G 15/043 (2006.01)
H04N 1/06 (2006.01)
H04N 1/113 (2006.01)
H04N 1/405 (2006.01)

(52) U.S. Cl.
CPC ............. *G03G 15/043* (2013.01); *H04N 1/06* (2013.01); *H04N 1/113* (2013.01); *H04N 1/405* (2013.01); *H04N 2201/0094* (2013.01)

(58) Field of Classification Search
CPC .......... H04N 1/06; H04N 1/113; H04N 1/405; H04N 2201/0094; G03G 15/043
See application file for complete search history.

(56) References Cited

U.S. PATENT DOCUMENTS

| | | | |
|---|---|---|---|
| 4,769,717 A * | 9/1988 | Okamoto | G06T 3/40 |
| | | | 358/302 |
| 8,837,011 B2 | 9/2014 | Takikawa et al. | H04N 1/40093 |
| 8,917,305 B2 | 12/2014 | Nakahata et al. | G03G 15/0415 |
| 9,261,809 B2 | 2/2016 | Furuta | G03G 15/04072 |

(Continued)

FOREIGN PATENT DOCUMENTS

JP 2012-098622 5/2012

OTHER PUBLICATIONS

U.S. Appl. No. 15/210,365, filed Jul. 14, 2016.

(Continued)

*Primary Examiner* — Clayton E Laballe
*Assistant Examiner* — Ruifeng Pu
(74) *Attorney, Agent, or Firm* — Fitzpatrick, Cella, Harper & Scinto

(57) ABSTRACT

An image forming apparatus including: a first processing unit configured to subject input image data to tone correction with use of a tone correction table; a second processing unit configured to subject the image data to dither processing; a correction unit configured to correct the image data with use of a correction amount based on positional deviation of scanning lines caused by a mirror face tangle error; a deflection unit configured to deflect light beams emitted from the light source with a mirror face to form the scanning lines; an extraction unit configured to extract a feature amount of the tone correction table; and an adjustment unit configured to adjust a change in tone characteristics in a case where the feature amount extracted by the extraction unit exceeds a predetermined range.

18 Claims, 23 Drawing Sheets

(56) References Cited

U.S. PATENT DOCUMENTS

| | | | |
|---|---|---|---|
| 2003/0052959 A1* | 3/2003 | Fujimoto | G02B 26/123 347/116 |
| 2003/0174364 A1* | 9/2003 | Goto | H04N 1/58 358/3.26 |
| 2003/0193536 A1* | 10/2003 | Kuronuma | H04N 1/047 347/9 |
| 2007/0159654 A1* | 7/2007 | Kambegawa | H04N 1/4072 358/1.15 |
| 2011/0181679 A1* | 7/2011 | Arai | G02B 26/123 347/224 |
| 2011/0228286 A1* | 9/2011 | Kaima | G06K 15/128 358/1.2 |
| 2013/0044347 A1* | 2/2013 | Kitai | H04N 1/4092 358/1.14 |
| 2013/0242315 A1* | 9/2013 | Shimahashi | G03G 15/043 358/1.1 |
| 2014/0333940 A1* | 11/2014 | Iwata | G03G 15/043 358/1.1 |
| 2015/0055184 A1* | 2/2015 | Lin | H04N 1/405 358/3.06 |
| 2015/0277324 A1* | 10/2015 | Goto | G03G 15/043 399/72 |
| 2016/0070195 A1* | 3/2016 | Tachibana | G03G 15/043 347/118 |
| 2016/0147170 A1 | 5/2016 | Furuta | G03G 15/043 |
| 2016/0334729 A1* | 11/2016 | Suhara | G03G 15/043 |

OTHER PUBLICATIONS

U.S. Appl. No. 15/210,380, filed Jul. 14, 2016.
U.S. Appl. No. 15/210,389, filed Jul. 14, 2016.
U.S. Appl. No. 15/210,394, filed Jul. 14, 2016.
U.S. Appl. No. 15/210,402, filed Jul. 14, 2016.
U.S. Appl. No. 15/222,692, filed Jul. 28, 2016.

* cited by examiner

SCANNING POSITIONS ARE
SHIFTED IN ADVANCE DIRECTION

SCANNING POSITIONS ARE
SHIFTED IN RETURN DIRECTION

SCANNING POSITIONS ARE DENSE

SCANNING POSITIONS ARE SPARSE

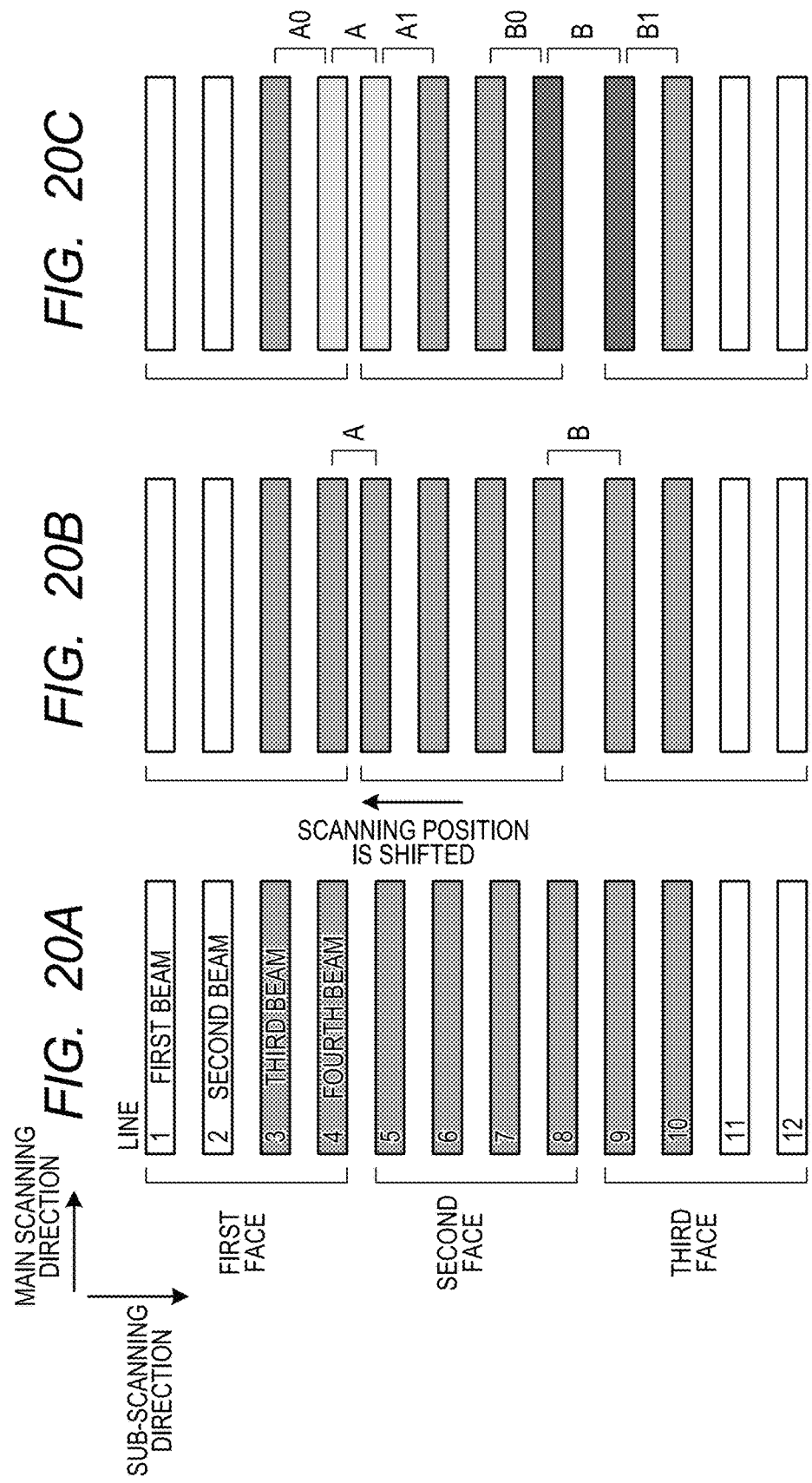

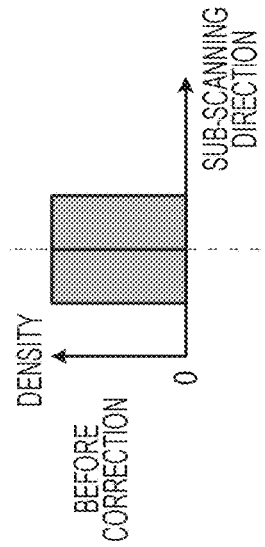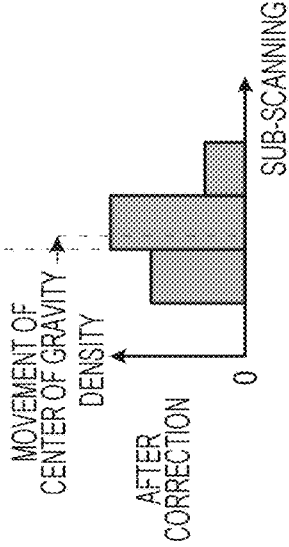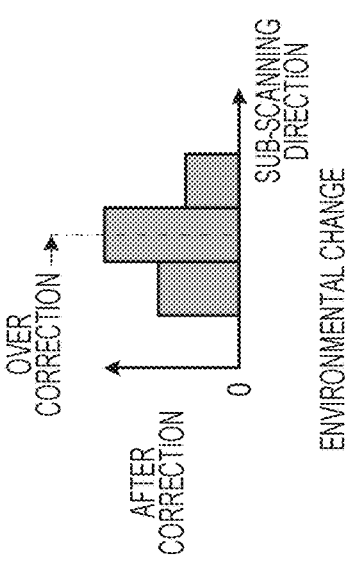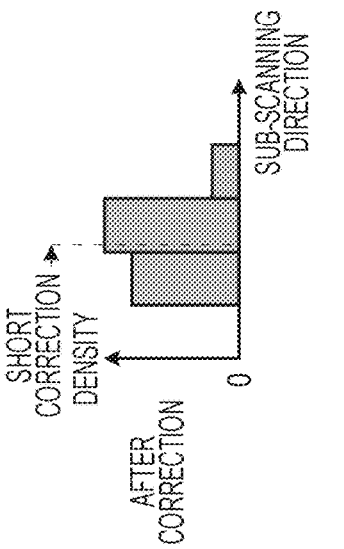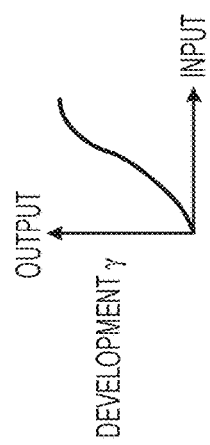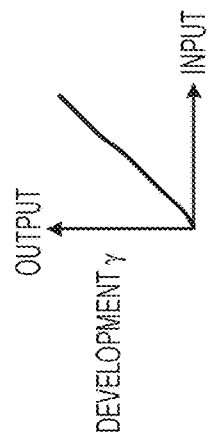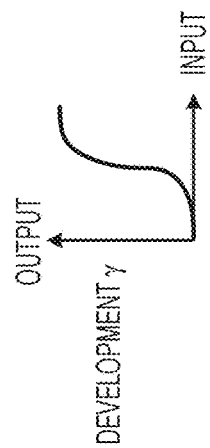

FIG. 22

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0000 | 0 | 0 | 0 | 0 | 0 | 0 | 0 | 0 | 0 | 0 | 0 | 0 | 0 | 0 | 0 | 0 |
| 0001 | 0 | 0 | 0 | 0 | 0 | 0 | 0 | 0 | 0 | 0 | 0 | 0 | 0 | 0 | 1 | 1 |
| 0010 | 0 | 0 | 0 | 0 | 0 | 0 | 0 | 0 | 0 | 0 | 0 | 0 | 0 | 1 | 1 | 1 |
| 0011 | 0 | 0 | 0 | 0 | 0 | 0 | 0 | 0 | 0 | 0 | 0 | 0 | 1 | 1 | 1 | 1 |
| 0100 | 0 | 0 | 0 | 0 | 0 | 0 | 0 | 0 | 0 | 0 | 0 | 1 | 1 | 1 | 1 | 1 |
| 0101 | 0 | 0 | 0 | 0 | 0 | 0 | 0 | 0 | 0 | 0 | 1 | 1 | 1 | 1 | 1 | 1 |
| 0110 | 0 | 0 | 0 | 0 | 0 | 0 | 0 | 0 | 0 | 1 | 1 | 1 | 1 | 1 | 1 | 1 |
| 0111 | 0 | 0 | 0 | 0 | 0 | 0 | 0 | 0 | 1 | 1 | 1 | 1 | 1 | 1 | 1 | 1 |
| 1000 | 0 | 0 | 0 | 0 | 0 | 0 | 0 | 1 | 1 | 1 | 1 | 1 | 1 | 1 | 1 | 1 |
| 1001 | 0 | 0 | 0 | 0 | 0 | 0 | 1 | 1 | 1 | 1 | 1 | 1 | 1 | 1 | 1 | 1 |
| 1010 | 0 | 0 | 0 | 0 | 0 | 1 | 1 | 1 | 1 | 1 | 1 | 1 | 1 | 1 | 1 | 1 |
| 1011 | 0 | 0 | 0 | 0 | 1 | 1 | 1 | 1 | 1 | 1 | 1 | 1 | 1 | 1 | 1 | 1 |
| 1100 | 0 | 0 | 0 | 1 | 1 | 1 | 1 | 1 | 1 | 1 | 1 | 1 | 1 | 1 | 1 | 1 |
| 1101 | 0 | 0 | 1 | 1 | 1 | 1 | 1 | 1 | 1 | 1 | 1 | 1 | 1 | 1 | 1 | 1 |
| 1110 | 0 | 1 | 1 | 1 | 1 | 1 | 1 | 1 | 1 | 1 | 1 | 1 | 1 | 1 | 1 | 1 |
| 1111 | 1 | 1 | 1 | 1 | 1 | 1 | 1 | 1 | 1 | 1 | 1 | 1 | 1 | 1 | 1 | 1 |

IMAGE FORMING APPARATUS

BACKGROUND OF THE INVENTION

Field of the Invention

The present invention relates to an image forming apparatus, which is configured to correct distortion and uneven image density of an image during image formation of a two-dimensional image by the image forming apparatus, e.g., a digital copying machine, a multifunctional peripheral, or a laser printer.

Description of the Related Art

In electrophotographic image forming apparatus such as a laser printer and a copying machine, there has been generally known a configuration to form a latent image on a photosensitive member with the use of a light scanning device configured to perform scanning with a laser beam. In the light scanning device of a laser scanning type, a laser beam collimated with the use of a collimator lens is deflected by a rotary polygon mirror, and the deflected laser beam is formed into an image on a photosensitive member with the use of an elongated fθ lens. Further, there is known multi-beam scanning in which a laser light source having a plurality of light emission points is included in one package so as to perform scanning with a plurality of laser beams simultaneously.

Meanwhile, in order to form a satisfactory image without uneven image density and banding, it is desired that distances between scanning lines of which positions to be scanned with a laser beam are adjacent to each other in a rotational direction of the photosensitive member be equal to each other. However, the distances between the scanning lines are varied due to a plurality of factors described below. The distances between the scanning lines on the photosensitive member are varied by, for example, a fluctuation in a surface speed of the photosensitive member, or a rotation speed fluctuation of a rotary polygon mirror. Further, the distances between the scanning lines are also varied by a variation in angle of mirror faces of the rotary polygon mirror with respect to a rotary shaft of the rotary polygon mirror and a variation in intervals between light emission points arranged on a laser light source. FIG. 19A is an illustration of a state in which an interval between the scanning lines is varied periodically, with scanning of laser beams being represented by horizontal lines. As illustrated in FIG. 19A, when the interval between the scanning lines of laser beams is small, an image is developed darkly. When the interval between the scanning lines of laser beams is large, an image is developed lightly. Thus, the development is liable to be detected as moire and the like. To cope with uneven image density and banding caused by such factors, there has been proposed a technology of correcting banding by controlling an exposure amount of the light scanning device. For example, in Japanese Patent Application Laid-Open No. 2012-098622, there is described a configuration in which a beam position detection unit configured to detect a beam position in a sub-scanning direction is arranged in the vicinity of the photosensitive member, and the exposure amount of the light scanning device is adjusted based on scanning distance information obtained from a detected beam position, to thereby make banding less noticeable.

Further, the image forming apparatus subjects image data to halftone processing with the use of a dither pattern, to thereby express a halftone (intermediate tone). In an image subjected to the halftone processing, for example, a line screen or a dot screen is used.

However, as a screen to be used in the halftone processing, there is given a screen that is liable to be influenced by a mirror face tangle error of a rotary polygon mirror (hereinafter simply referred to as "optical face tangle error of a rotary polygon mirror") and a screen that is less liable to be influenced by the optical face tangle error of a rotary polygon mirror. FIG. 19B and FIG. 19C are each a view for illustrating a phenomenon of the optical face tangle error of a rotary polygon mirror. In FIG. 19B and FIG. 19C, a gray portion represents a dither pattern. Further, a light gray portion (white portion) represents an area in which the interval between scanning lines of a laser beam emitted from a light source is sparse, and a dark gray portion (black portion) represents an area in which the interval between scanning lines is dense. In an image using the line screen of FIG. 19B, streaks of the line screen regularly extend in an area of the occurrence of sparseness and denseness of the scanning lines, and hence moire appears strongly. Meanwhile, in an image using the dot screen of FIG. 19C, as compared to the line screen, dots irregularly overlap an area of the occurrence of sparseness and denseness, and the occurrence frequency of shading difference is lower than that of the line screen, with the result that the intensity of moire is smaller than that of the line screen.

Further, when an exposure amount is controlled for correcting uneven image density caused by sparseness and denseness of the scanning lines, the density per predetermined area is not stored before and after correction, and hence correction does not act well depending on a pattern of an input image, and the performance of correction may be degraded. In FIG. 20A to FIG. 20C, the horizontal direction represents a main scanning direction, and the vertical direction represents a sub-scanning direction. Further, each rectangle represents a scanning trajectory of a laser beam, and the darkness of the rectangle represents the intensity of lighting of a laser beam. In this case, first to third faces of the mirror faces of a rotary polygon mirror are expressed in a unit of four beams downwardly. As compared to FIG. 20A in which no optical face tangle error of the rotary polygon mirror occurs, an optical face tangle error that is shifted upward occurs in FIG. 20B. When the conventional correction is performed with respect to FIG. 20B, results as illustrated in FIG. 20C are obtained. In FIG. 20C, density is decreased in areas A0 and A1 as a result of the correction, and density is increased in areas B0 and B1 as a result of the correction. Therefore, correction cannot be performed appropriately.

In view of the above-mentioned conventional method, there is considered a method involving correction of sparseness and denseness by moving a center of gravity of density across a plurality of pixels. However, in the method involving movement of a center of gravity of density, there is also a risk in that the effects of correction may not be obtained when the moved density cannot be reproduced with high accuracy in accordance with the tone characteristics. Further, a change with time, and environmental fluctuations, e.g., fluctuations in temperature and humidity, greatly influence electrophotographic tone characteristics. For example, even when appropriate correction as shown in FIG. 21B is performed, the performance of the correction may be degraded as shown in FIG. 21C and FIG. 21D depending on environmental change and the like. Therefore, there is a demand for performing correction appropriately even when tone characteristics are changed due to environmental fluctuations.

SUMMARY OF THE INVENTION

The present invention has been made under the above-mentioned circumstances, and it is an object of the present invention to form an image with stable quality by performing appropriate correction even when the tone change due to the change with time and the environmental fluctuations occurs.

In order to solve the above-mentioned problems, according to one embodiment of the present invention, there is provided an image forming apparatus, comprising:

a first processing unit configured to subject input image data to tone correction with use of a tone correction table;

a second processing unit configured to subject the image data subjected to the tone correction by the first processing unit to dither processing;

a correction unit configured to correct the image data subjected to the dither processing by the second processing unit with use of a correction amount based on positional deviation of scanning lines in a first direction caused by a mirror face tangle error of a deflection unit;

a light source including a plurality of light emitting points and configured to emit light beams based on the image data corrected by the correction unit;

a photosensitive member configured to rotate in the first direction so that a latent image is formed on the photosensitive member by the light beams emitted from the light source;

the deflection unit configured to deflect the light beams emitted from the light source with the mirror face and cause light spots of the light beams radiated on the photosensitive member to be moved in a second direction orthogonal to the first direction to form the scanning lines;

a developing unit configured to develop the latent image formed on the photosensitive member;

an extraction unit configured to extract a feature amount of the tone correction table to determine that tone characteristics have been changed; and an adjustment unit configured to adjust a change in the tone characteristics by determining that the tone characteristics have been changed in a case where the feature amount extracted by the extraction unit exceeds a predetermined range.

Further features of the present invention will become apparent from the following description of exemplary embodiments with reference to the attached drawings.

BRIEF DESCRIPTION OF THE DRAWINGS

FIGS. 20A, 20B and 20C are each a view for illustrating optical face tangle error correction in the conventional art.

FIGS. 21A, 21B, 21C, 21D, 21E, 21F and 21G are each a graph for showing that optical face tangle error correction in the conventional art is influenced by environmental fluctuations.

FIG. 22 is a diagram for showing a conversion table for converting image data (density data) into drive data for generating a PWM signal.

DESCRIPTION OF THE EMBODIMENTS

Exemplary embodiments of the present invention will be described in detail below in an illustrative manner with reference to the drawings. A direction of an axis of rotation of a photosensitive drum, which is a direction in which scanning is performed with a laser beam, is defined as a main scanning direction that is a second direction, and a rotational direction of the photosensitive drum, which is a direction substantially orthogonal to the main scanning direction, is defined as a sub-scanning direction which is a first direction. First, description is given in detail with reference to FIG. 19B, FIG. 19C, FIG. 20A to FIG. 20C, and FIG. 21A to FIG. 21G.

(Influence of Optical Face Tangle Error on Dither)

Figure 19A:
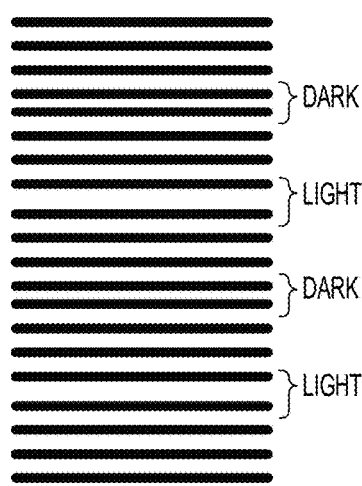
FIG. 19A is a view for illustrating uneven image density in the conventional art.
Figure 19B:
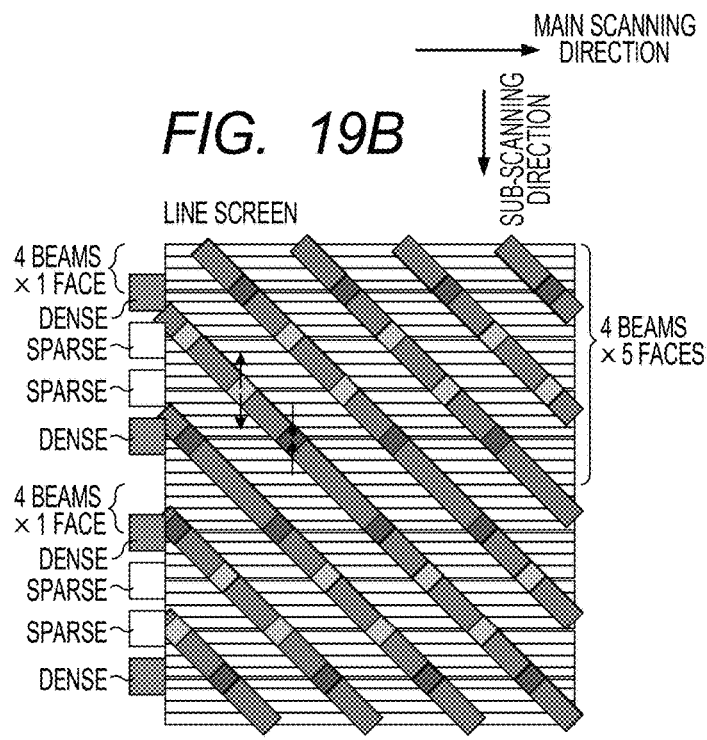
FIGS. 19B and 19C are each a view for illustrating influence of an optical face tangle error on a dither.
Figure 19C:
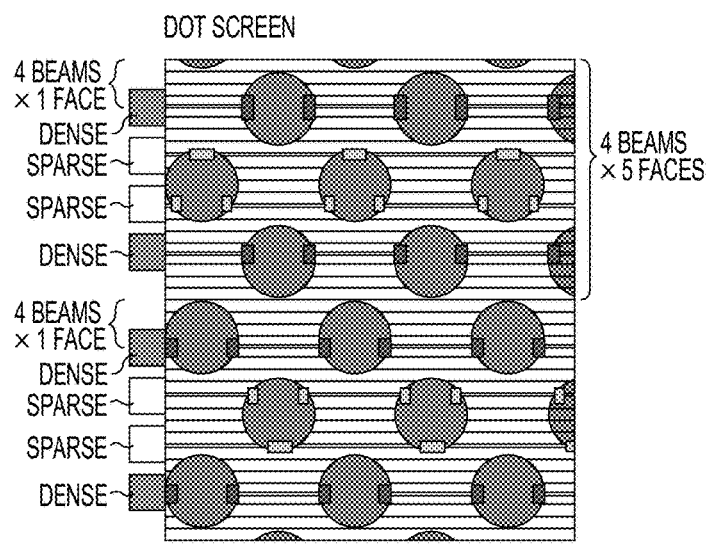

FIG. 19B and FIG. 19C are each a view for illustrating a phenomenon of an optical face tangle error of a rotary polygon mirror. In this case, description is given assuming that the rotary polygon mirror includes five mirror faces, and a light source includes four light emitting points. Laser beams emitted from the light source are deflected by the mirror faces of the rotary polygon mirror, and scanning lines are formed on a body to be scanned. In FIG. 19B and FIG. 19C, the scanning lines formed with four laser beams deflected by one mirror face of the rotary polygon mirror are represented by a horizontally long rectangle. The longitudinal direction of the rectangle representing the scanning line is a main scanning direction, and the direction orthogonal to the main scanning direction is a sub-scanning direction. The photosensitive drum is exposed to twenty lines (=4 beams×5 faces) of laser beams per one revolution of the rotary polygon mirror. Therefore, sparseness and denseness caused by an optical face tangle error of the rotary polygon mirror occurs in a boundary between the scanning line of the fourth beam of predetermined one scanning and the scanning line of the first beam of one scanning subsequent to the predetermined one scanning, and the sparseness and denseness are repeated with a period of twenty lines of the laser beams. In FIG. 19B and FIG. 19C, a gray portion represents a dither pattern. Further, a light gray portion (white portion) represents an area in which the interval between the scanning lines is sparse, and a dark gray portion (black portion) represents an area in which the interval between the scanning lines is dense.

FIG. 19B is an image in which a halftone is represented by a line screen at an inclination of 45° with respect to the sub-scanning direction. In this image, streaks of the line screen regularly extend in an area of the occurrence of sparseness and denseness of intervals between the scanning lines, and hence moire appears strongly. Meanwhile, FIG. 19C is an image in which a halftone is represented by a dot screen including dots arranged so as to have an inclination of 45° with respect to the sub-scanning direction. In the dot screen, as compared to the line screen, dots irregularly overlap an area of the occurrence of sparseness and denseness of intervals between the scanning lines, and the occurrence frequency of contrasting density is lower than that of the line screen, with the result that the intensity of moire is smaller than that of the line screen.

(Correction by Conventional Method)

In the conventional art, a light intensity of a light beam (e.g., fourth light beam) at an end of one scanning in the sub-scanning direction is corrected based on sparseness and denseness of a distance from an adjacent light beam (e.g., first light beam in subsequent one scanning). However, appropriate correction may not be possible to perform depending on an input image pattern. In FIG. 20A to FIG. 20C, the horizontal direction represents a main scanning direction, and the vertical direction represents a sub-scanning direction. Further, each rectangle represents a scanning trajectory of a laser beam, and the darkness of the rectangle represents the intensity (that is, light intensity) of lighting of a laser beam. In this case, the first to third faces of the mirror faces of the rotary polygon mirror are expressed in a unit of four beams downwardly.

FIG. 20A is a view for illustrating a state in which no optical face tangle error of the rotary polygon mirror occurs when the light source is lit continuously from the third line of the first face to the second line of the third face (hereinafter referred to as "from line 3 to line 10"). FIG. 20B is a view for illustrating a state in which an optical face tangle error, in which the scanning position is shifted upward, occurs on the second mirror face of the rotary polygon mirror when the light source is similarly lit continuously from line 3 to line 10. As illustrated in FIG. 20B, as a result of the occurrence of the optical face tangle error on the second face of the rotary polygon mirror, an area A in which a portion between the first face and the second face becomes dense is formed to increase density. Further, as illustrated in FIG. 20B, as a result of the occurrence of the optical face tangle error on the second face of the rotary polygon mirror, an area B in which a portion between the second face and the third face becomes sparse is formed to decrease density. Thus, when the optical face tangle error of the rotary polygon mirror occurs, uneven image density occurs as a whole. FIG. 20C is a view for illustrating the results obtained through correction of the optical face tangle error of the rotary polygon mirror of FIG. 20B by the conventional method. Also in areas A0 and A1 adjacent to the area A and areas B0 and B1 adjacent to the area B in the sub-scanning direction, the interval between the laser beams remains unchanged from the original beam interval. Therefore, in the areas A0 and A1 on both sides of the area A that is dense in FIG. 20B, the density is decreased as a result of the correction as illustrated in FIG. 20C. Further, in the areas B0 and B1 on both sides of the area B that is sparse in FIG. 20B, the density is increased as a result of the correction as illustrated in FIG. 20C. Thus, in FIG. 20C, the correction of an optical face tangle error of the rotary polygon mirror rather causes uneven image density, and hence correction cannot be performed appropriately.

In view of the above-mentioned conventional method, there is considered a method involving correction of sparseness and denseness by moving a center of gravity of density across a plurality of pixels. However, in the method involving movement of a center of gravity of density, there is also a risk in that the effects of correction may not be obtained when the moved density cannot be reproduced with high accuracy in accordance with the tone characteristics.

(Influence of Change in Tone Characteristics)

A change with time, and environmental fluctuations, e.g., fluctuations in temperature and humidity, greatly influence electrophotographic tone characteristics. The influence will be described with reference to FIG. 21A, FIG. 21B, FIG. 21C, and FIG. 21D. FIG. 21A to FIG. 21D are each a graph in which the horizontal axis represents a position in the sub-scanning direction, and the vertical axis represents density. The density changes depending on an exposure amount, and hence bars of bar graphs shown in FIG. 21A to FIG. 21D represent an exposure amount at each position in the sub-scanning direction. In input image data shown in FIG. 21A, a center of gravity of density is located at a position indicated by the alternate long and short dash line. Such input image data is corrected to move the center of gravity of density in a predetermined direction as indicated by the arrow of FIG. 21B (hereinafter referred to as "movement of center of gravity"). When the photosensitive drum is exposed to light based on the input image data corrected as shown in FIG. 21B, and development is performed with predetermined tone characteristics as shown in FIG. 21E, optimum effects are obtained. In this case, FIG. 21E is a graph for showing response characteristics of an image tone, in which an input of the horizontal axis represents an exposure amount, and an output of the vertical axis represents toner density after development. The characteristics of FIG. 21E are also referred to as a tone characteristics table (hereinafter sometimes referred to as "LUT") or "development γ".

However, for example, toner characteristics may be changed due to environmental fluctuations to have linear characteristics as shown in FIG. 21F or characteristics causing sudden rise at a predetermined exposure amount as shown in FIG. 21G. In such case, when development is performed with the tone characteristics of FIG. 21F, excessive correction is performed as shown in FIG. 21C. Meanwhile, when development is performed with the tone characteristics of FIG. 21G, correction becomes insufficient as shown in FIG. 21D.

First Embodiment

Overall Configuration of Image Forming Apparatus

Figure 1A:
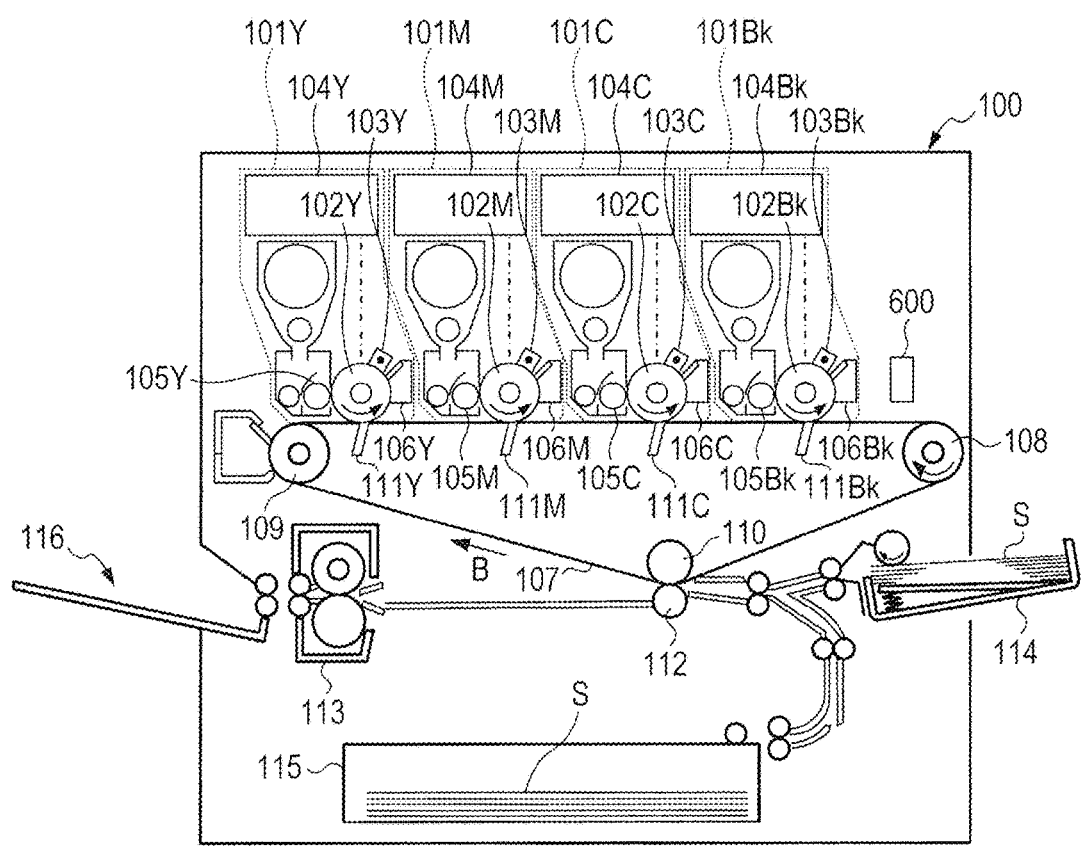
FIG. 1A is a view for illustrating an entire image forming apparatus according to a first embodiment to a third embodiment.

FIG. 1A is a schematic cross-sectional view of a digital full-color printer (color image forming apparatus) configured to perform image formation by using toners of a plurality of colors. An image forming apparatus 100 according to a first embodiment of the present invention will be described with reference to FIG. 1A. The image forming apparatus 100 includes four image forming portions (image forming units) 101Y, 101M, 101C, and 101Bk (broken line portions) respectively configured to form images of different colors. The image forming portions 101Y, 101M, 101C, and 101Bk form images by using toners of yellow, magenta, cyan, and black, respectively. Reference symbols Y, M, C, and Bk denote yellow, magenta, cyan, and black, respectively, and suffixes Y, M, C, and Bk are omitted in the description below unless a particular color is described.

The image forming portions 101 each include a photosensitive drum 102, being a photosensitive member. A charging device 103, a light scanning device 104, and a developing device 105 serving as a developing unit are arranged around each of the photosensitive drums 102. A cleaning device 106 is further arranged around each of the photosensitive drums 102. An intermediate transfer belt 107 of an endless belt type is arranged under the photosensitive drums 102. The intermediate transfer belt 107 is stretched around a drive roller 108 and driven rollers 109 and 110, and rotates in a direction of an arrow B (clockwise direction) illustrated in FIG. 1A while forming an image. Further, primary transfer devices 111 are arranged at positions opposed to the photosensitive drums 102 across the intermediate transfer belt 107 (intermediate transfer member). The image forming apparatus 100 according to the embodiment further includes a secondary transfer device 112 configured to transfer the toner image on the intermediate transfer belt 107 onto a sheet S being a recording medium and a fixing device 113 configured to fix the toner image on the sheet S.

An image forming process from a charging step to a developing step of the image forming apparatus 100 will be described. The image forming process is the same in each of the image forming portions 101, and hence the image forming process will be described with reference to an example of the image forming portion 101Y. Accordingly, descriptions of the image forming processes in the image forming portions 101M, 101C, and 101Bk are omitted. The photosensitive drum 102Y which is driven to rotate in the arrow direction (counterclockwise direction) illustrated in FIG. 1A is charged by the charging device 103Y of the image forming portion 101Y. The charged photosensitive drum 102Y is exposed by a laser beam emitted from the light scanning device 104Y, which is indicated by the dashed dotted line. With this operation, an electrostatic latent image is formed on the rotating photosensitive drum 102Y (on the photosensitive member). The electrostatic latent image formed on the photosensitive drum 102Y is developed as a toner image of yellow by the developing device 105Y. The same step is performed also in the image forming portions 101M, 101C, and 101Bk.

The image forming process from a transfer step will be described. The primary transfer devices 111 applied with a transfer voltage transfer toner images of yellow, magenta, cyan, and black formed on the photosensitive drums 102 of the image forming portions 101 onto the intermediate transfer belt 107. With this, the toner images of respective colors are superimposed one on another on the intermediate transfer belt 107. That is, the toner images of four colors are transferred onto the intermediate transfer belt 107 (primary transfer). The toner images of four colors transferred onto the intermediate transfer belt 107 are transferred onto the sheet S conveyed from a manual feed cassette 114 or a sheet feed cassette 115 to a secondary transfer portion by the secondary transfer device 112 (secondary transfer). Then, the unfixed toner images on the sheet S are heated and fixed onto the sheet S by the fixing device 113, to thereby form a full-color image on the sheet S. The sheet S having the image formed thereon is delivered to a delivery portion 116. The image forming apparatus 100 includes sensors 600 configured to detect density and the like of an image on the intermediate transfer belt 107 in the vicinity of the drive roller 108.

<Photosensitive Drum and Light Scanning Device>

Figure 1B:
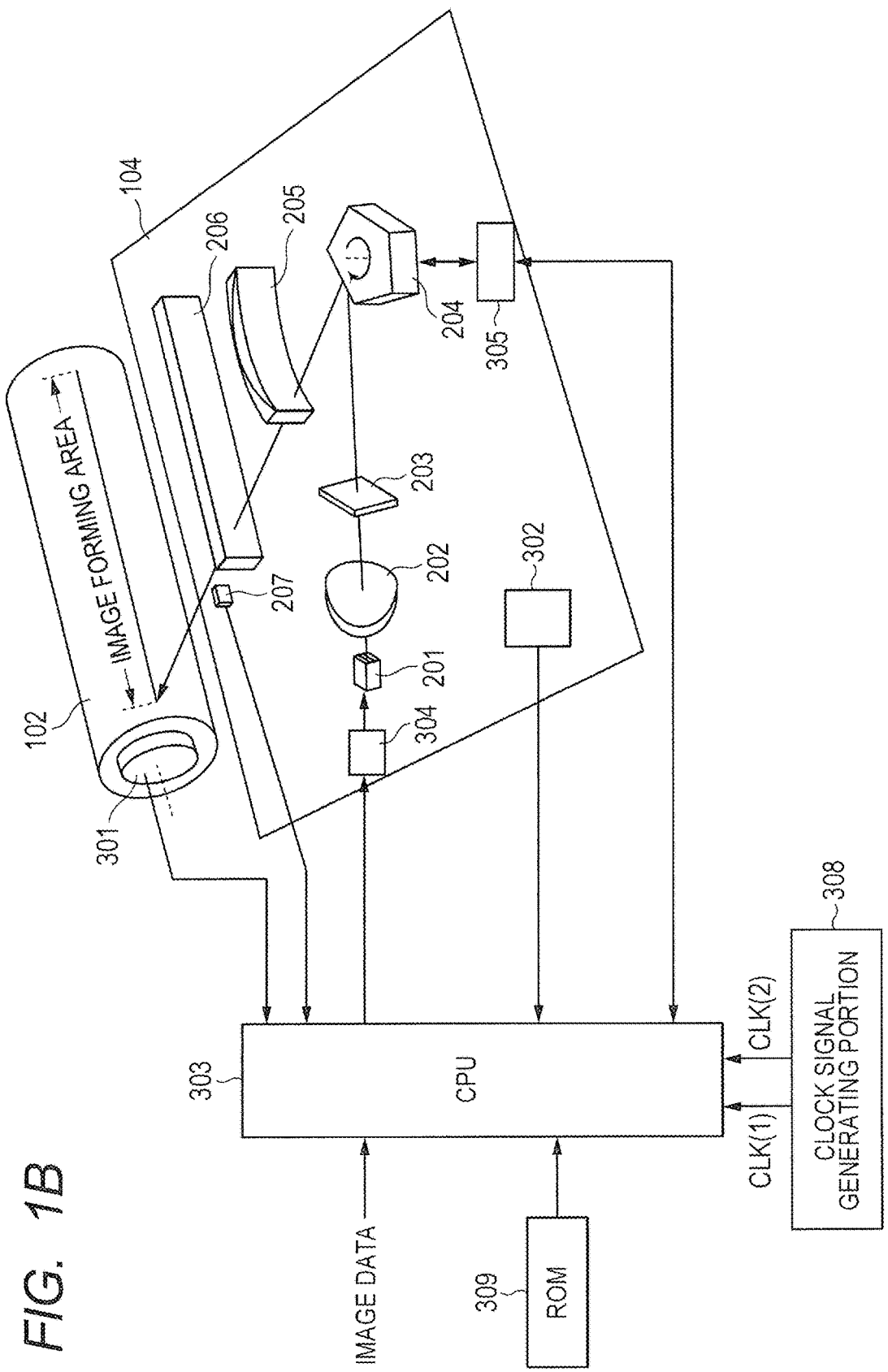
FIG. 1B is a view for illustrating a configuration of the periphery of a photosensitive drum and a light scanning device.

FIG. 1B is an illustration of configurations of the photosensitive drum 102, the light scanning device 104, and a controller for the light scanning device 104. The light scanning device 104 includes a laser light source 201, a collimator lens 202, a cylindrical lens 203, and a rotary polygon mirror 204. The laser light source 201 includes a plurality of light emission points. The plurality of light emission points are each configured to emit a laser beam (light beam). The collimator lens 202 is configured to collimate the laser beam. The cylindrical lens 203 condenses the laser beam having passed through the collimator lens 202 in a sub-scanning direction. In the embodiment, the laser light source 201 is described by exemplifying a light source in which a plurality of light emission points are arranged, but is similarly operated also in the case of using a single light source. The laser light source 201 is driven by a laser drive circuit 304. The rotary polygon mirror 204 is formed of a motor portion configured to be operated to rotate and a reflection mirror mounted on a motor shaft. A face of the reflection mirror of the rotary polygon mirror 204 is hereinafter referred to as "mirror face". The rotary polygon mirror 204 is driven by a rotary polygon mirror drive portion 305. The light scanning device 104 includes fθ lenses 205 and 206 configured to receive a laser beam (scanning light) deflected by the rotary polygon mirror 204. Further, the light scanning device 104 includes a memory 302 configured to store various pieces of information.

Further, the light scanning device 104 includes a beam detector 207 (hereinafter referred to as "BD 207") that is a signal generating unit configured to detect the laser beam deflected by the rotary polygon mirror 204 and output a horizontal synchronization signal (hereinafter referred to as "BD signal") in accordance with the detection of the laser beam. The laser beam output from the light scanning device 104 scans the photosensitive drum 102. The direction of the laser beam is substantially parallel to the rotary shaft of the photosensitive drum 102. Every time the mirror face of the rotary polygon mirror 204 scans the photosensitive drum 102, the light scanning device 104 causes a laser beam emitted from the laser light source to move (scan) in the main scanning direction, to thereby form scanning lines corresponding to the number of laser elements (light emitting points) simultaneously. In the embodiment, a configuration is described in which the rotary polygon mirror 204 has five mirror faces, and the laser light source 201 includes eight laser elements, as an example. In the embodiment, an image of eight lines is formed with one mirror face of the rotary polygon mirror 204, that is, one scanning of the laser beam. The rotary polygon mirror 204 scans the photosensitive drum 102 five times per one revolution of the rotary polygon mirror 204, to thereby form an image of forty lines in total.

The photosensitive drum 102 includes a rotary encoder 301 on the rotary shaft, and the rotation speed of the photosensitive drum 102 is detected with the use of the rotary encoder 301. The rotary encoder 301 is configured to generate 1,000 pulses per one revolution of the photosensitive drum 102. In the rotary encoder 301, a measuring portion (not shown) configured to measure a time interval between pulses is arranged on an internal substrate. The rotary encoder 301 is configured to output information (rotation speed data) on the rotation speed of the photosensitive drum 102 to a CPU 303 based on the time interval between pulses measured by the measuring portion. A known speed detection technology other than the above-mentioned rotary encoder 301 may be used as long as the rotation speed of the photosensitive drum 102 can be detected. As a method other than the use of the rotary encoder 301, there is given, for example, a configuration to detect the surface speed of the photosensitive drum 102 with a laser Doppler.

Figure 2:
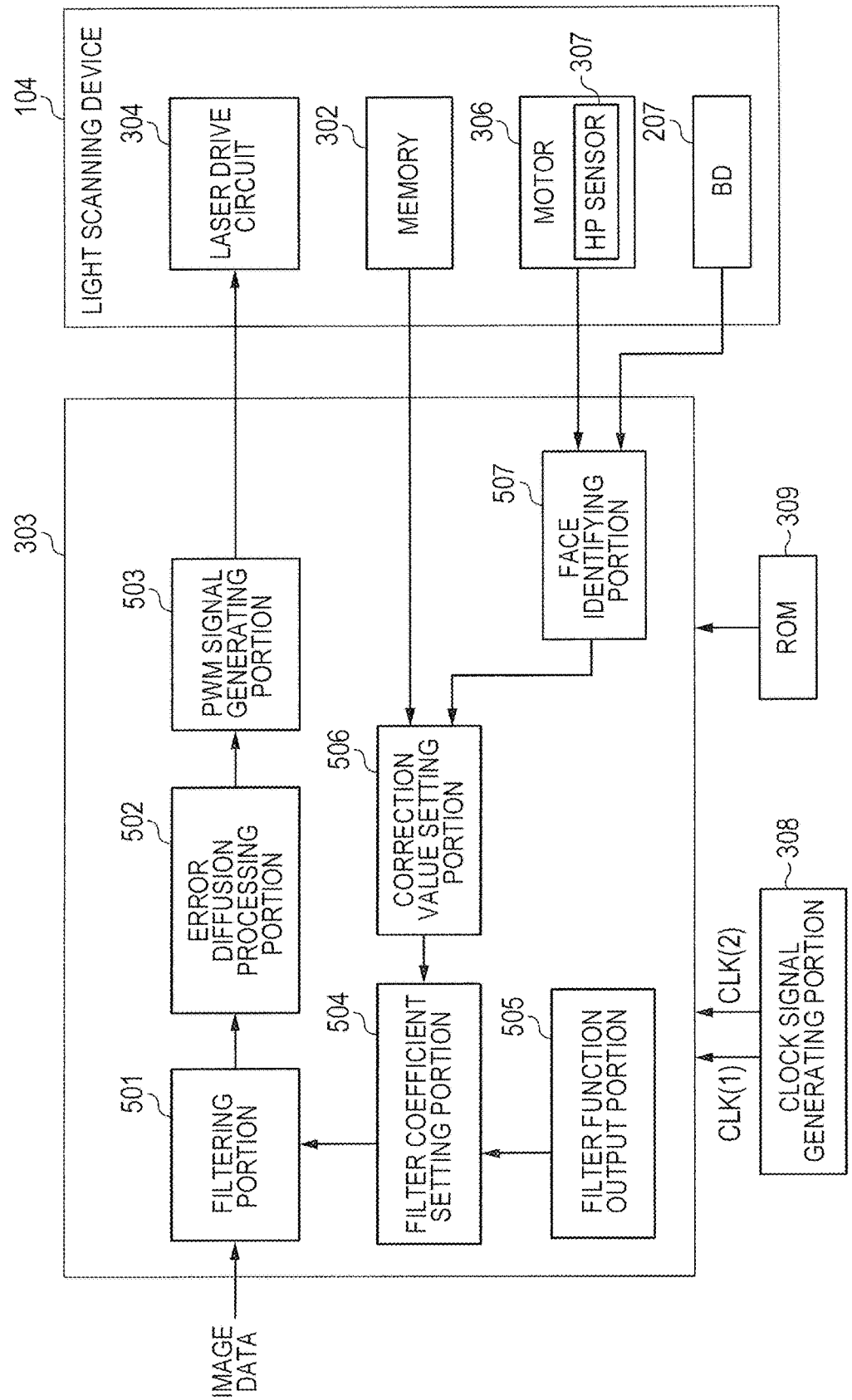
FIG. 2 is a block diagram of the image forming apparatus according to the first embodiment to the third embodiment.

Next, the CPU 303 serving as a controller, and a clock signal generating portion 308 will be described with reference to FIG. 2. The CPU 303 and the clock signal generating portion 308 are mounted on the image forming apparatus 100. FIG. 2 is a block diagram for illustrating the functions of the CPU 303 configured to execute correction processing of correcting distortion and uneven image density of an image described later as a correction unit, a conversion unit, and a filtering unit. The CPU 303 includes a filtering portion 501, an error diffusion processing portion 502, and a PWM signal generating portion 503. The filtering portion 501 is configured to perform filtering by subjecting input image data to a convolution operation. The error diffusion processing portion 502 is configured to subject the image data after the filtering to error diffusion processing. The PWM signal generating portion 503 is configured to subject the image data (density data) after the error diffusion processing to PWM transformation and output a PWM signal to the laser drive circuit 304 of the light scanning device 104. The clock signal generating portion 308 is configured to output a clock signal CLK(1) and a clock signal CLK(2) to the CPU 303. The clock signal CLK(1) is a clock signal illustrated in FIG. 2. The clock signal CLK(1) is a signal generated by multiplying the clock signal CLK(2). Thus, the clock signal CLK(1) and the clock signal CLK(2) have a synchronization relationship. In the embodiment, the clock signal generating portion 308 outputs the clock signal CLK(1) generated by multiplying the clock signal CLK(2) by 16 to the CPU 303. The clock signal CLK(2) is a signal having a period corresponding to one pixel. The clock signal CLK(1) is a signal having a period corresponding to divided pixels obtained by dividing one pixel by 16.

Further, the CPU 303 includes a filter coefficient setting portion 504, a filter function output portion 505, and a correction value setting portion 506. The filter function output portion 505 is configured to output data on a function to be used for a convolution operation (for example, data in a table) to the filter coefficient setting portion 504. As a function to be used for the convolution operation, there is given, for example, linear interpolation and bicubic interpolation. The correction value setting portion 506 is configured to identify a mirror face which reflects a laser beam from among a plurality of mirror faces based on a face synchronization signal input from a face identifying portion 507. The correction value setting portion 506 is configured to determine a positional deviation amount in the rotation direction of the photosensitive drum 102 of a scanning line formed with a laser beam deflected by the mirror face identified by the face identifying portion 507 described later. The correction value setting portion 506 then calculates a correction value based on the positional deviation amount and outputs the calculated correction value to the filter coefficient setting portion 504. The filter coefficient setting portion 504 is configured to calculate a filter coefficient based on information on the convolution function input from the filter function output portion 505 and the correction value input from the correction value setting portion 506. The filter coefficient is to be used for the filtering in the filtering portion 501. The filter coefficient setting portion 504 is configured to set the calculated filter coefficient in the filtering portion 501. The correction value input to the filter coefficient setting portion 504 from the correction value setting portion 506 is a correction value set individually for each of the plurality of mirror faces.

Further, the CPU 303 includes the face identifying portion 507. The face identifying portion 507 is configured to identify a mirror face of the rotary polygon mirror 204 based on an HP signal input from a home position sensor (hereinafter referred to as "HP sensor") 307 of the light scanning device 104 and the BD signal input from the BD 207. The face identifying portion 507 is configured to output information of the identified mirror face to the correction value setting portion 506 as a face synchronization signal.

As illustrated in FIG. 1B, the CPU 303 is configured to receive image data from an image controller (not shown) configured to generate image data. The image data is tone data indicating a density value. The tone data is data of a plurality of bits indicating a density value for each pixel. For example, in the case of image data of 4 bits, a density value for one pixel is expressed by 16 tones, and in the case of image data of 8 bits, a density value for one pixel is expressed by 256 tones. In the embodiment, the image data input to the CPU 303 from the image controller is 4 bits per pixel. The filtering portion 501 is configured to subject the image data to filtering for each pixel in synchronization with the clock signal CLK(2). The CPU 303 is connected to the rotary encoder 301, the BD 207, the memory 302, and the rotary polygon mirror drive portion (hereinafter referred to as "mirror drive portion") 305. The CPU 303 is configured to detect a write position of a scanning line based on the BD signal input from the BD 207 and count a time interval of the BD signal, to thereby detect the rotation speed of the rotary polygon mirror 204. Further, the CPU 303 is configured to output an acceleration or deceleration signal for designating acceleration or deceleration to the mirror drive portion 305 so that the rotary polygon mirror 204 reaches a predetermined speed. The mirror drive portion 305 is configured to supply a driving current to the motor portion of the rotary polygon mirror 204 in accordance with the acceleration or deceleration signal input from the CPU 303, to thereby drive a motor 306.

The HP sensor 307 is mounted on the rotary polygon mirror 204 and is configured to output the HP signal to the CPU 303 at timing at which the rotary polygon mirror 204 reaches a predetermined angle during a rotation operation. For example, the HP signal is generated once during every rotation of the rotary polygon mirror 204. The face identifying portion 507 resets an internal counter in response to the generation of the HP signal. Then, the face identifying portion 507 increments a count value of the internal counter by "1" every time the BD signal is input. That is, each count value of the internal counter is information indicating a corresponding one of the plurality of mirror faces of the rotary polygon mirror 204. The CPU 303 can identify which of the plurality of mirror faces the input image data corresponds to with the use of the count value. That is, the CPU 303 can switch a filter coefficient for correcting the input image data with the use of the count value.

The memory 302 is configured to store, for each mirror face, position information (first scanning position information) indicating positional deviation amounts from ideal scanning positions in the sub-scanning direction of a plurality of laser beams reflected by the mirror faces of the rotary polygon mirror 204. Further, the memory 302 is configured to store position information (second scanning position information) indicating a positional deviation amount from the ideal scanning position in the sub-scanning direction of the laser beam emitted from each light emission point. The CPU 303 is configured to read from the memory 302 positional deviation information in the sub-scanning direction caused by an optical face tangle error for each mirror face of the rotary polygon mirror 204 and positional deviation information of a multibeam laser of 1,200 dpi with respect to the ideal position in the sub-scanning direction. The CPU 303 is configured to calculate position information of each scanning line based on the positional deviation information read from the memory 302.

The correction value setting portion 506 is configured to calculate a correction value based on the position information of each scanning line input from the memory 302 and output the calculated correction value to the filter coefficient setting portion 504. The filter coefficient setting portion 504 is configured to calculate a filter coefficient with the use of the correction value input from the correction value setting portion 506 and a filter function input from the filter function output portion 505. The filtering portion 501 is configured to receive image data from the image controller (not shown) configured to generate image data. The filtering portion 501 is configured to subject the image data to the filtering based on the filter coefficient input from the filter coefficient setting portion 504, to thereby calculate image data taking information for correcting the position of each scanning line into account. The PWM signal generating portion 503 of the CPU 303 is configured to convert the image data taking the information for correcting the position of each scanning line into account into drive data. A ROM 309 is configured to store a conversion table for converting image data of 4 bits into drive data of 16 bits as illustrated in FIG. 22. A vertical axis of the conversion table shown in FIG. 22 represents image data indicating density values of 4 bits, which corresponds to one pixel. A horizontal axis of the conversion table shown in FIG. 22 represents drive data of bits associated with the density values of 4 bits individually. For example, in the case where image data input to the PWM signal generating portion 503 is a bit pattern of "0110", the PWM signal generating portion 503 converts the image data "0110" into drive data that is a bit pattern of "0000000001111111" with the use of the conversion table.

The PWM signal generating portion 503 outputs the converted drive data in the order of "0000000001111111" serially on a bit basis in accordance with the clock signal CLK(1) described later. When the PWM signal generating portion 503 outputs the drive data, a PWM signal is generated. When the PWM signal generating portion 503 outputs "1", a light emission point emits a laser beam. When the PWM signal generating portion 503 outputs "0", a light emission point does not output a laser beam.

Figure 3:
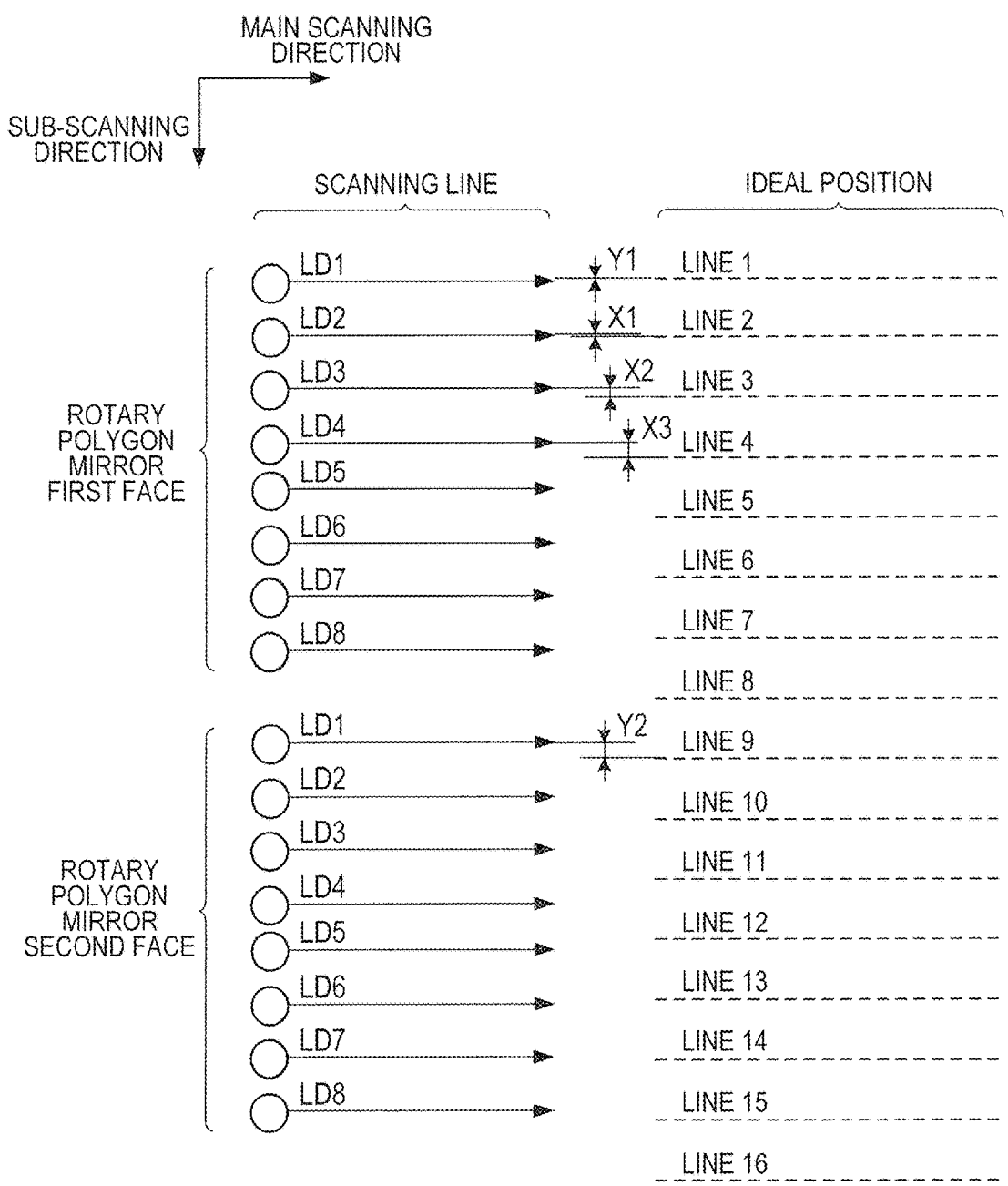
FIG. 3 is a diagram for illustrating positional deviation of scanning lines according to the first embodiment to the third embodiment.

Next, scanning position information stored in the memory 302 will be described with reference to FIG. 3 and Table 1. FIG. 3 is an illustration of a state of positional deviation of each scanning line from an ideal position. Scanning lines scanned by each laser beam of the laser light source having eight light emission points are denoted by LD1, LD2, LD3, LD4, LD5, LD6, LD7, and LD8. An ideal interval (predetermined interval) between the respective scanning lines is determined based on a resolution. For example, in the case of an image forming apparatus having a resolution of 1,200 dpi, an ideal interval between the respective scanning lines is 21.16 μm. When the scanning line LD1 is defined as a reference position, ideal distances D2 to D8 of the scanning lines LD2 to LD8 from the scanning line LD1 are calculated by Expression (1).

$$Dn=(n-1)\times 21.16 \text{ μm } (n=2 \text{ to } 8) \quad \text{Expression (1)}$$

For example, the ideal distance D4 from the scanning line LD1 to the scanning line LD4 is 63.48 μm (=(4−1)×21.16 μm).

In this case, an interval between the scanning lines on the photosensitive drum 102 has an error due to an error of arrangement intervals of the plurality of light emission points and characteristics of a lens. The positional deviation amounts of the scanning line positions of the scanning lines LD2 to LD8 with respect to ideal positions determined based on the ideal distances D2 to D8 are denoted by X1 to X7. Regarding the first face of the rotary polygon mirror 204, for example, the positional deviation amount X1 of the scanning line LD2 is defined as a difference between the ideal position of the scanning line LD2 (hereinafter referred to as "LINE 2", which similarly applies to the other scanning lines) and the actual scanning line. Further, for example, the positional deviation amount X3 of the scanning line LD4 is defined as a difference between the LINE 4 and the actual scanning line.

Due to a variation in manufacturing of each mirror face of the rotary polygon mirror 204, the mirror faces of the rotary polygon mirror 204 are not completely parallel to the rotary shaft, and the rotary polygon mirror 204 has an angle variation for each mirror face. The positional deviation amounts with respect to the ideal positions in each mirror face of the rotary polygon mirror 204 are denoted by Y1 to Y5 when the number of the faces of the rotary polygon mirror 204 is five. In FIG. 3, the deviation amount of the scanning line LD1 of the first face from the ideal position is Y1, and the deviation amount of the scanning line LD1 of the second face from the ideal position is Y2. In the embodiment, the positional deviation amounts Y1 to Y5 are adjusted in consideration of the influence of a change in the development γ based on the positional deviation amounts Y1 to Y5 stored in the memory 302 and a correction amount and a phase amount determined for adjusting a correction amount of an optical face tangle error in Step S808 of FIG. 8 described later. In the description below, when a correction amount for adjusting a correction amount of an optical face tangle error is determined in Step S808 of FIG. 8 described later, the positional deviation amounts Y1 to Y5 refer to the positional deviation amounts that reflect the correction amount for adjusting a correction amount of an optical face tangle error.

A mirror face of the rotary polygon mirror 204 is defined as an m-th face, and a positional deviation amount of a scanning line (LDn) by an n-th laser beam from the laser light source is denoted by Zmn. Then, the positional deviation amount Zmn is represented by Expression (2) with the use of the positional deviation amounts X1 to X7 of each scanning line and the positional deviation amounts Y1 to Y5 of each mirror face.

$$Zmn=Ym+X(n-1) \; (m=1 \text{ to } 5, n=1 \text{ to } 8) \quad \text{Expression (2)}$$

(Where X(0)=0.)

For example, a positional deviation amount Z14 regarding the scanning line LD4 in the first face of the rotary polygon mirror 204 is determined to be Z14=Y1+X3 by Expression (2). Further, a positional deviation amount Z21 regarding the scanning line LD1 in the second face of the rotary polygon mirror 204 is determined to be Z21=Y2 by Expression (2).

When the positional deviation amount Zmn is calculated by Expression (2), it is only necessary that the number of pieces of data to be used for calculating the positional deviation amount Zmn correspond to the number of the mirror faces of the rotary polygon mirror 204 and the number of light emission points of the laser light source. An address map of positional deviation data stored in the memory 302 is shown in Table 1.

TABLE 1

| Address | Data |
|---------|------|
| 0 | LD2 Position Information X1 |
| 1 | LD3 Position Information X2 |
| 2 | LD4 Position Information X3 |
| 3 | LD5 Position Information X4 |
| 4 | LD6 Position Information X5 |
| 5 | LD7 Position Information X6 |
| 6 | LD8 Position Information X7 |
| 7 | First Face Position Information Y1 |
| 8 | Second Face Position Information Y2 |
| 9 | Third Face Position Information Y3 |
| 10 | Fourth Face Position Information Y4 |
| 11 | Fifth Face Position Information Y5 |

As shown in Table 1, information on the respective positional deviation amounts (described as position information) X1 to X7 of the scanning line LD2 to the scanning line LD8 is stored in from an address 0 to an address 6 of the memory 302. Further, information on the respective positional deviation amounts Y1 to Y5 of the first face to the fifth face of the mirror faces of the rotary polygon mirror 204 is stored in from an address 7 to an address 11 of the memory 302.

In the embodiment, description is given on the assumption that the eight scanning lines of each laser beam are deviated uniformly due to the positional deviation of each mirror face of the rotary polygon mirror 204. However, when there is a variation in positional deviation amount of each scanning line of a laser beam for each mirror face of the rotary polygon mirror 204, there may be stored information on a positional deviation amount only for a combination of each mirror face of the rotary polygon mirror 204 and each scanning line of the laser beam. That is, in this case, forty pieces of position information are stored in the memory 302 with the number of the mirror faces of the rotary polygon mirror 204 being five, and the number of light emission points of the laser light source 201 being eight.

(Memory Storage Operation)

As information on a positional deviation amount to be stored in the memory 302, for example, data measured in an adjustment step of the light scanning device 104 in a factory or the like is stored. Further, the image forming apparatus 100 may include a position detection unit configured to detect the position of a scanning line scanned with a laser beam emitted from the laser light source 201 so that the information stored in the memory 302 may be updated in real time. As the position detection unit configured to detect a position of scanning light in the sub-scanning direction, a known technology may be used. For example, a position may be detected by a CMOS sensor or a position sensitive detector (PSD) arranged in the light scanning device 104 or arranged on a scanning path of a laser beam near the photosensitive drum 102. Further, a triangular slit may be formed in a surface of a photo diode (PD) arranged in the light scanning device 104 or arranged near the photosensitive drum 102, to thereby detect a position from an output pulse width of the PD.

Figure 4:
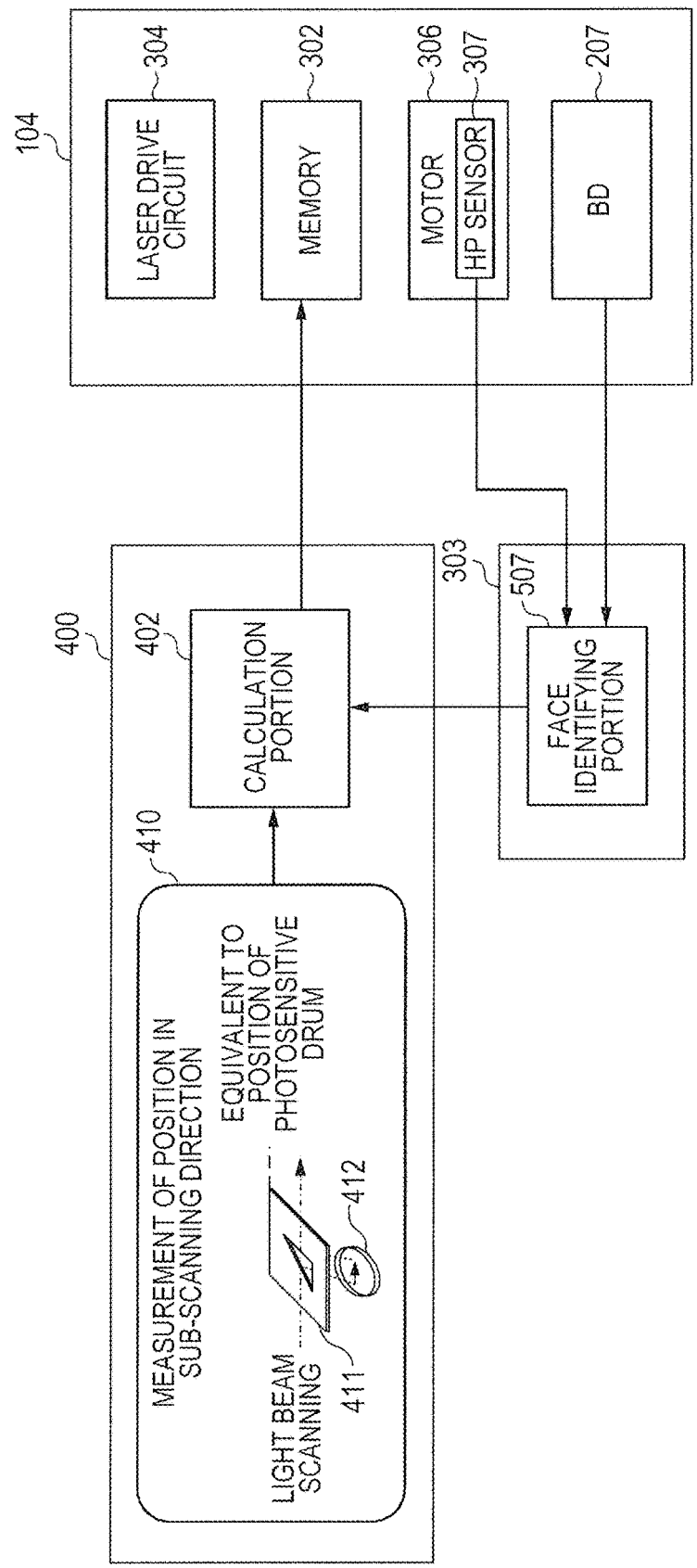
FIG. 4 is a block diagram for illustrating a step of storing information in a memory according to the first embodiment to the third embodiment.

FIG. 4 is a block diagram for illustrating a step of storing information in the memory 302 of the light scanning device 104 in a factory or the like as an example. The same configurations as those of FIG. 2 are denoted by the same reference symbols as those therein, and the description thereof is omitted. In the adjustment step for the light scanning device 104, a measuring instrument 400 is arranged at a position corresponding to the scanning position on the photosensitive drum 102 when the light scanning device 104 is mounted on the image forming apparatus 100. The measuring instrument 400 includes a measuring portion 410 and a calculation portion 402, and the calculation portion 402 is configured to receive a surface synchronization signal from the surface identifying portion 507 of the CPU 303 of FIG. 2. In the CPU 303 of FIG. 4, only the surface identifying portion 507 is illustrated. First, a laser beam is radiated on the measuring portion 410 from the light scanning device 104. The measuring portion 410 includes a triangular slit 411 and a PD 412. A laser beam emitted from the light scanning device 104 indicated by the arrow with the alternate long and short dash line in FIG. 4 scans the triangular slit 411. The measuring portion 410 measures the position in the sub-scanning direction of a scanning line based on information on the laser beam input to the PD 412 through the triangular slit 411. The measuring portion 410 outputs information on the measured position in the sub-scanning direction of the scanning line in each mirror face (hereinafter referred to as "data for each face") of the rotary polygon mirror 204 to the calculation portion 402.

Meanwhile, the face identifying portion 507 is configured to receive the HP signal from the HP sensor 307 of the light scanning device 104 and receive the BD signal from the BD 207. With this, the face identifying portion 507 is configured to identify a mirror face of the rotary polygon mirror 204 and output information on the identified mirror face to the calculation portion 402 as a face synchronization signal. The calculation portion 402 is configured to write the information on the position in the sub-scanning direction of the scanning line measured by the measuring portion 410 into an address on the memory 302 of the light scanning device 104 in accordance with the information on the mirror face of the rotary polygon mirror 204 input from the face identifying portion 507. Thus, the information on the positional deviation amounts of the scanning lines caused by a variation in intervals between the eight light emission points of the laser light source 201 (X1 to X7) and the information on the positional deviation amounts of the scanning lines caused by an optical face tangle error of the mirror face of the rotary polygon mirror 204 (Y1 to Y5) are stored in the memory 302.

(Print Job)

The print job according to the embodiment will be described with reference to the flowchart of FIG. 5. When the CPU 303 receives a print job from an operation portion (not shown) or external equipment (not shown), the CPU 303 performs the processing in Step S602 and the subsequent steps. Further, the CPU 303 is also configured to perform an initial operation of resetting a timer (not shown) and a counter (not shown) to be used in the subsequent processing. In Step S602, the CPU 303 determines whether or not to start page processing after the preparation for page processing by a series of electrophotographic processes has been completed. When the CPU 303 determines in Step S602 that the page processing cannot be started because the preparation for the page processing has not been completed, the CPU 303 repeats the processing in Step S602. When the CPU 303 determines in Step S602 that the page processing can be started because the preparation for the page processing has been completed, the CPU 303 performs the page processing in Step S603. The CPU 303 starts the counter for managing the number of sheets for image formation to be used for determination in Step S606 described later or the timer for determining a time from the start of the print job. The page processing performed by the CPU 303 in Step S603 will be described later with reference to FIG. 7.

When the CPU 303 determines in Step S604 whether or not the print job has been completed and determines that the print job has been completed, the CPU 303 terminates the processing. When the CPU 303 determines in Step S604 that the print job has not been completed, the CPU 303 proceeds to the processing in Step S606. In Step S606, the CPU 303 refers to the counter or the timer, to thereby determine whether or not the number of sheets for image formation from the start of the print job has reached a predetermined number, or whether or not the time from the start of the print job has reached a predetermined time. When the CPU 303 determines in Step S606 that the number of sheets has not reached the predetermined number or that the time has not reached the predetermined time, the CPU 303 returns to the processing in Step S602. When the CPU 303 determines in Step S606 that the number of sheets has reached the predetermined number or that the time has reached the predetermined time, the CPU 303 resets the counter or the timer and proceeds to the processing in Step S607. In Step S607, the CPU 303 outputs patches for detecting a density fluctuation of each dither.

(Patches)

Figure 6A:
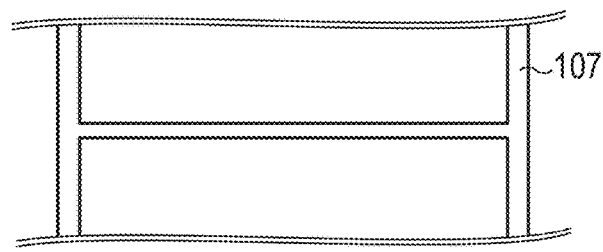
FIGS. 6A, 6B and 6C are each a view for illustrating patches between pages according to the first embodiment.
Figure 6B:
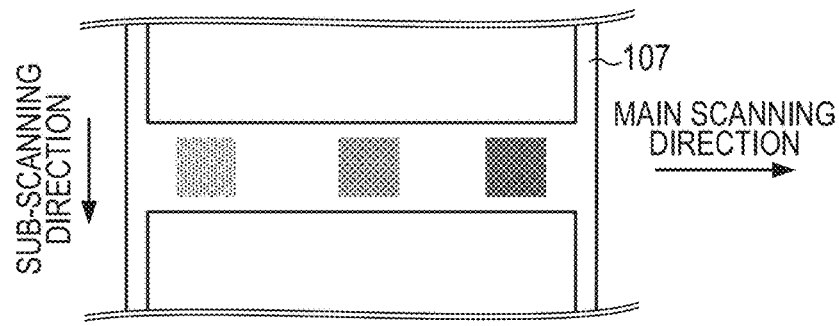
Figure 6C:
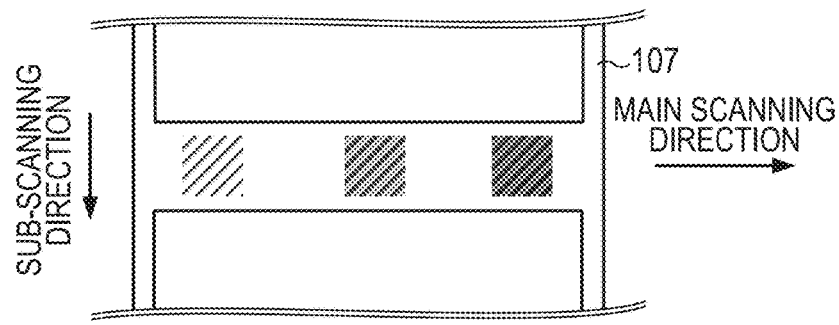

Now, description is given of patches to be formed on the intermediate transfer belt 107 by the time the image formation of a subsequent page is started when the number of sheets for image formation has reached the predetermined number or the time from the start of the print job has reached the predetermined time. FIG. 6A to FIG. 6C are each a view for illustrating a relationship of patches (test images) with respect to an interval between an image of a page and an image of a subsequent page in the sub-scanning direction on the intermediate transfer belt 107 (hereinafter referred to as "between pages"). When the number of sheets for image formation has not reached the predetermined number, or the time from the start of the print job has not reached the predetermined time, patches are not output. Therefore, as illustrated in FIG. 6A, an interval between the pages is controlled so as to be a minimum interval that enables printing to be performed on sheets continuously, and a printing speed is prioritized. Meanwhile, in a portion between the pages in which patches are output when the number of sheets for image formation has reached the predetermined number or when the time from the start of the print job has reached the predetermined time, at least one patch of a predetermined size is output in accordance with the position of the sensors 600 configured to read density.

For example, in the embodiment, as illustrated in FIG. 6B and FIG. 6C, patches to be output between the pages are arranged at three positions in the main scanning direction. The number of patches to be measured for density by the sensors 600 is a product of the dither kind and the tone number, and hence three patches are selected therefrom to be output successively in the main scanning direction. The reason for outputting patches for each kind of dither is that, when dithers to be selected are different, even patches that have the same tone are output with different densities, and a tone correction table (LUT) described later is required for each kind of dither. FIG. 6B is an example in which patches formed with the use of the dot screen described with reference to FIG. 19C are output, and FIG. 6C is an example in which patches formed with the use of the line screen described with reference to FIG. 19B are output.

In the embodiment, the patches formed on the intermediate transfer belt 107 are read by the sensors 600 arranged, for example, in the vicinity of the drive roller 108 and at a position opposed to the intermediate transfer belt 107 to be detected for density. In the embodiment, the patches are formed between the pages. However, for example, the patches may be formed after the completion of the print job, and the density thereof may be read by the sensors 600. Further, the patches may be printed on a sheet, and a printed sheet having the patches printed thereon may be read by an image reading apparatus, e.g., a scanner (not shown), to thereby detect density thereof.

Figure 5:
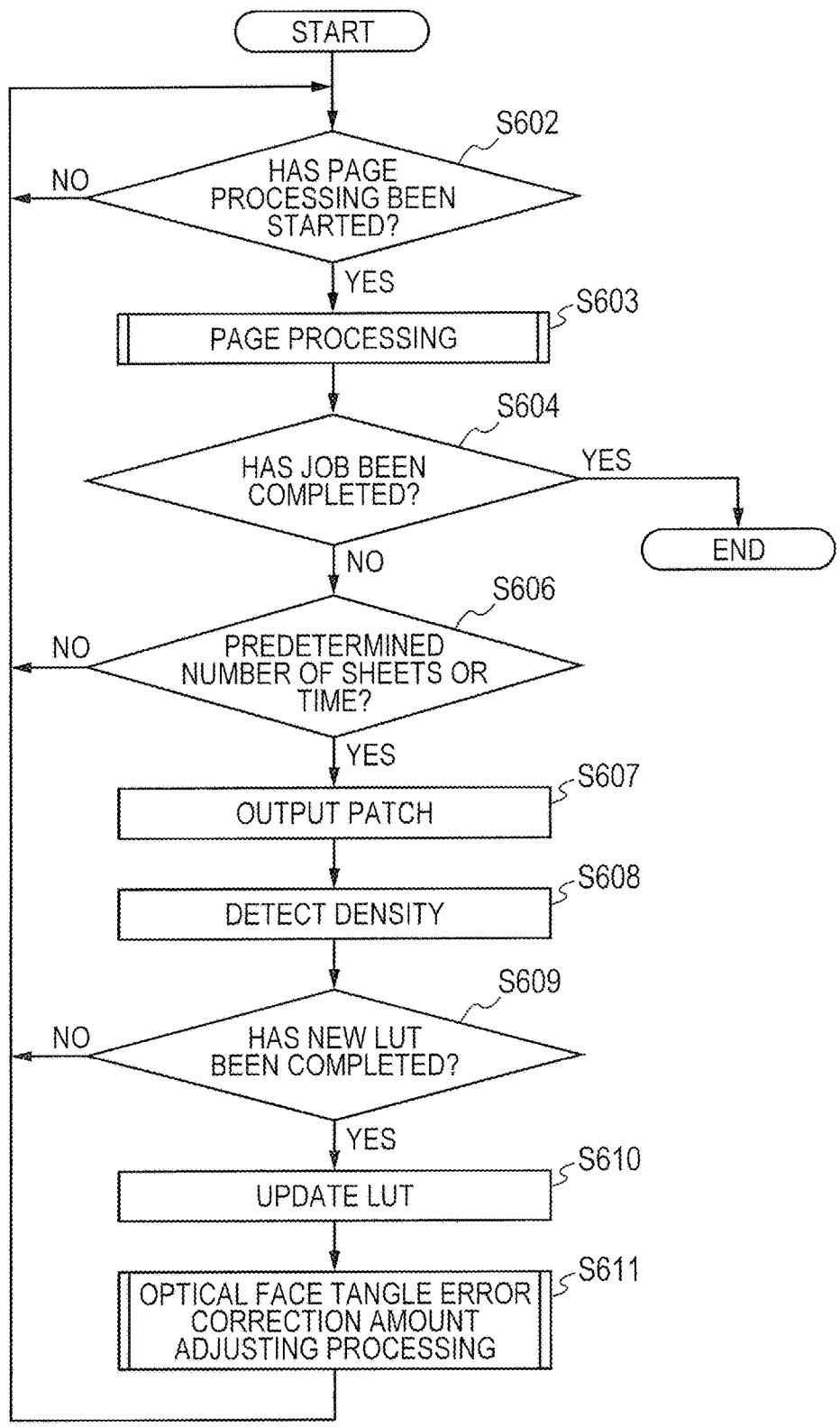
FIG. 5 is a flowchart for illustrating a job according to the first embodiment.

Referring back to the description of FIG. 5, in Step S608, the CPU 303 reads, for example, patches as illustrated in FIG. 6B or FIG. 6C with the sensors 600, to thereby detect the density of the patches. The CPU 303 associates the density of the patches read by the sensors 600 with the tone of the read patches and stores the density and tone in a storage portion such as a RAM (not shown). In Step S609, the CPU 303 determines whether or not the number of pieces of data on the density of the patches associated with the tone of the patches stored in the storage portion (hereinafter simply referred to as "number of patches detected for density") has reached a predetermined number, that is, whether or not a new tone correction table (LUT) has been completed. When the CPU 303 determines in Step S609 that the new tone correction table (LUT) has not been completed, the CPU 303 returns to the processing in Step S602. When the CPU 303 determines in Step S609 that the number of patches detected for density has reached the predetermined number, and the new tone correction table (LUT) has been completed, the CPU 303 proceeds to the processing in Step S610. In this case, the data on the number of patches, which is a product of the dither kind and the tone number described above, is stored in the storage portion. When a plurality of dithers are prepared as in the embodiment, a new tone correction table (LUT) is created from the dithers for which the data on the required number of patches is prepared, and the processing in Step S611 described later is performed.

Figure 6D:
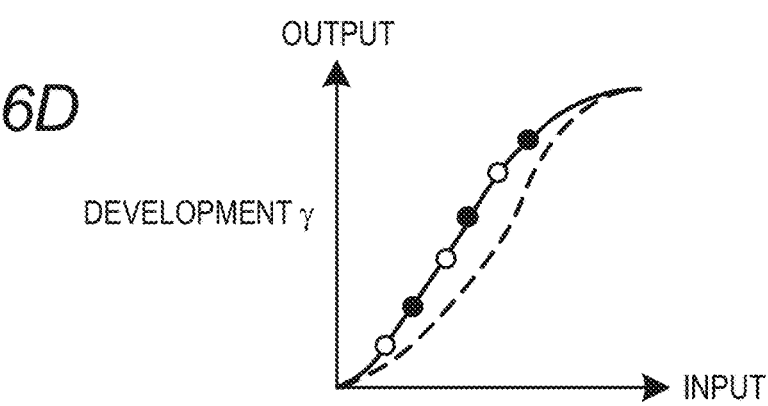
FIG. 6D is a graph for showing tone correction of a dither.

In Step S610, the CPU 303 updates the completed tone correction table (LUT) for dither processing. In the embodiment, the CPU 303 determines that the number of patches detected for density has reached the predetermined number when the number of patches detected for density regarding the same dither (e.g., a line screen) has reached the number corresponding to six tones for two times (3 patches per one time×2 times). Then, when the CPU 303 determines that the number of patches has reached the predetermined number, the CPU 303 updates the tone correction table (LUT). FIG. 6D is a graph for showing states before and after the update of the tone correction table (LUT). In FIG. 6D, the broken line represents the state before the update, and the solid line represents the state after the update. Further, the black circles on the graph after the update of FIG. 6D represent points obtained by measuring the density of three patches of the first time formed between the pages with the sensors 600, and white circles thereon represent points obtained by measuring the density of three patches of the second time formed between the pages with the sensors 600. Further, information between the respective points (between the data) obtained by measuring the density of the patches output at different tones with the sensors 600, in other words, information on the tone at which the patches are not formed is determined, for example, by performing interpolation processing. In Step S611, the CPU 303 performs adjusting processing for a correction amount of an optical face tangle error described later with reference to FIG. 8 and returns to the processing in Step S602.

(Page Processing)

Figure 7:
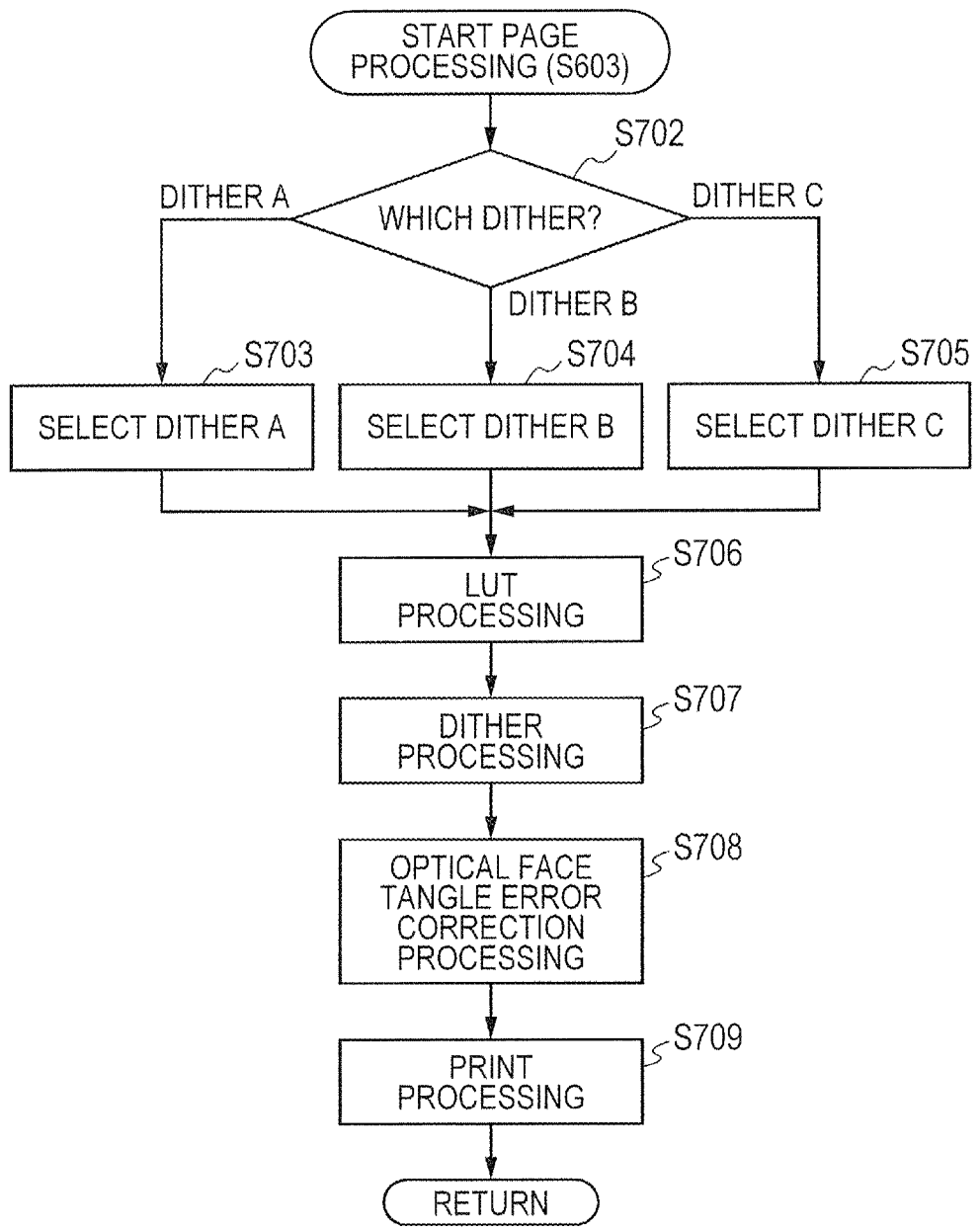
FIG. 7 is a flowchart for illustrating page processing according to the first embodiment.

The page processing in Step S603 of FIG. 5 will be described with the use of the flowchart of FIG. 7. In the embodiment, image formation is performed with the use of a dither in order to express a halftone of an image. In Step S702, the CPU 303 determines which dither method is selected in order to detect the features of an image to select an optimum dither for each area formed of a plurality of pixels. An image on one page includes various kinds of images, e.g., a character and a picture, and for example, the character and the picture have different image features. The features of the image are extracted with the use of a known method. For example, when an image forming apparatus is used as a printer, the features of an image are extracted based on a command sent from a personal computer. When the image forming apparatus is used as a copying machine, the features of an image are extracted based on the results obtained by subjecting the image read by the image reading device to the filtering.

In the embodiment, an optimum dither (in other words, a screen) is selected for each area formed of a plurality of pixels. However, for example, an optimum dither may be selected for each page, or an optimum dither may be selected for each pixel. In the embodiment, a dither A using a line screen, a dither B using a dot screen, or a dither C using error diffusion is selected as the dither. When dithers to be selected are different, even patches having the same area tone are output at different densities. Thus, a tone correction table (LUT) is required for each kind of dither.

When the CPU 303 determines in Step S702 that the dither A is selected, the CPU 303 selects a tone correction table for the dither A (line screen) in Step S703 and proceeds to the processing in Step S706. When the CPU 303 determines in Step S702 that the dither B is selected, the CPU 303 selects a tone correction table for the dither B (dot screen) in Step S704 and proceeds to the processing in Step S706. When the CPU 303 determines in Step S702 that the dither C is selected, the CPU 303 selects a tone correction table for the dither C (error diffusion) in Step S705 and proceeds to the processing in Step S706. Thus, the CPU 303 selects the tone correction table (LUT) suitable for the features of the image. Therefore, even in an image on one page, the dither A is applied to an area, and the dither B is applied to another area. Thus, an appropriate dither is selected in accordance with the image of the area. In Step S706, the CPU 303 performs tone correction with the use of the tone correction table (LUT) selected in Step S703 to Step S705. The CPU 303 also serves as a first processing unit for performing tone correction. In Step S707, the CPU 303 performs dither processing. The CPU 303 also serves as a second processing unit for performing dither processing. Known technologies are used for the tone correction in Step S706 and the dither processing in Step S707, and the description thereof is omitted.

In Step S708, the CPU 303 subjects the image subjected to the dither processing in Step S707 to optical face tangle error correction. The CPU 303 also serves as a correction unit for performing the optical face tangle error correction of the rotary polygon mirror 204. In Step S709, the CPU 303 performs image formation on a recording material by an electrophotographic process, to thereby terminate page processing. The optical face tangle error correction processing in Step S708 will be described later in detail.

(Adjustment for Correction Amount of Optical Face Tangle Error)

Figure 8:
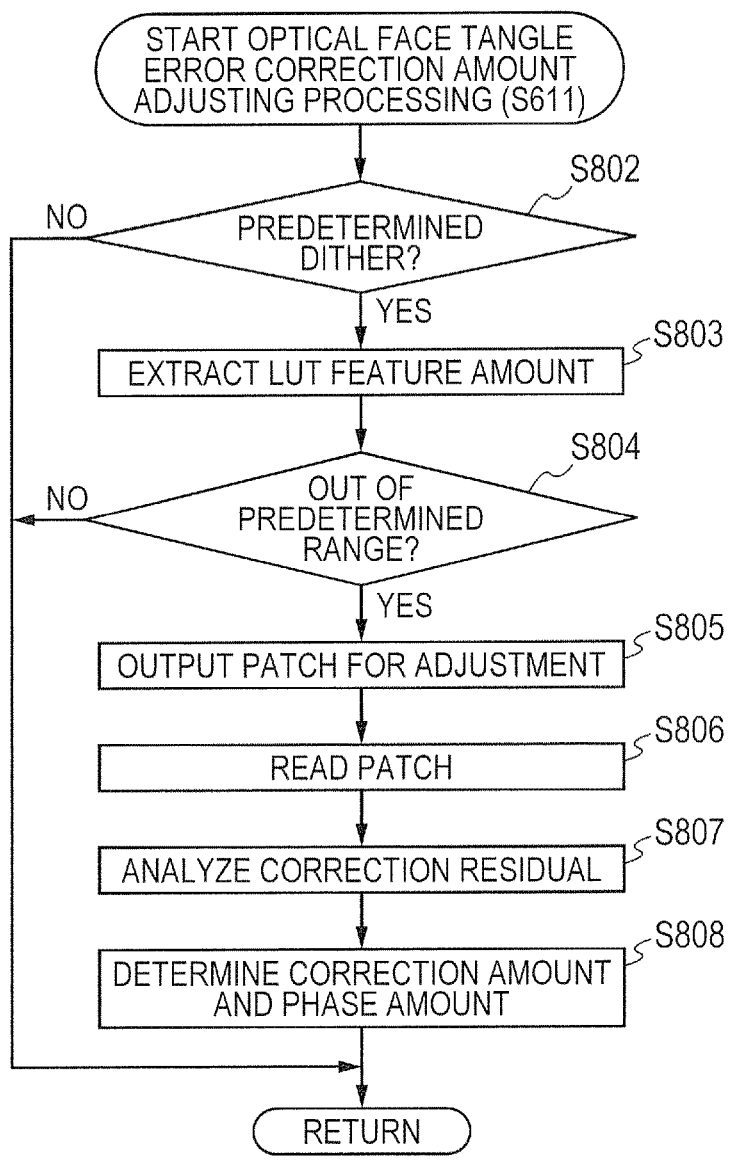
FIG. 8 is a flowchart for illustrating adjusting processing for a correction amount of an optical face tangle error according to the first embodiment.

The adjusting processing for a correction amount of an optical face tangle error in Step S611 of FIG. 5 will be described with reference to the flowchart of FIG. 8. When the adjusting processing for a correction amount of an optical face tangle error is started, the CPU 303 determines in Step S802 whether or not the dither for which the tone correction table (LUT) has been updated in Step S610 is a predetermined dither. In this case, the predetermined dither is the dither C, and the reason for this will be described later. When the CPU 303 determines in Step S802 that the dither for which the tone correction table (LUT) has been updated is not the predetermined dither, the CPU 303 terminates the adjusting processing for a correction amount of an optical face tangle error. When the CPU 303 determines in Step S802 that the dither for which the tone correction table (LUT) has been updated is the predetermined dither, the CPU 303 extracts a feature amount of the toner correction table (LUT) in Step S803. The CPU 303 also serves as an extraction unit configured to extract a feature amount of the tone correction table (LUT).

As described above, in the embodiment, the predetermined dither is the dither C that is error diffusion. In the error diffusion screening and the FM screening, dots to be formed are smaller as compared to the line screen and the dot screen in which dots to be formed are biased, and thus, the error diffusion screening and the FM screening are considered as uniformly distributed electrophotographic characteristics. Therefore, when the feature amount of the development $\gamma$ is extracted, it is preferred to use the dither C instead of the dithers A and B. In the embodiment, when the dither for which the tone correction table (LUT) has been updated is the dither C, the processing in Step S803 and the subsequent processing of FIG. 8 are performed in order to determine whether or not the development $\gamma$ has been changed.

Figure 9A:
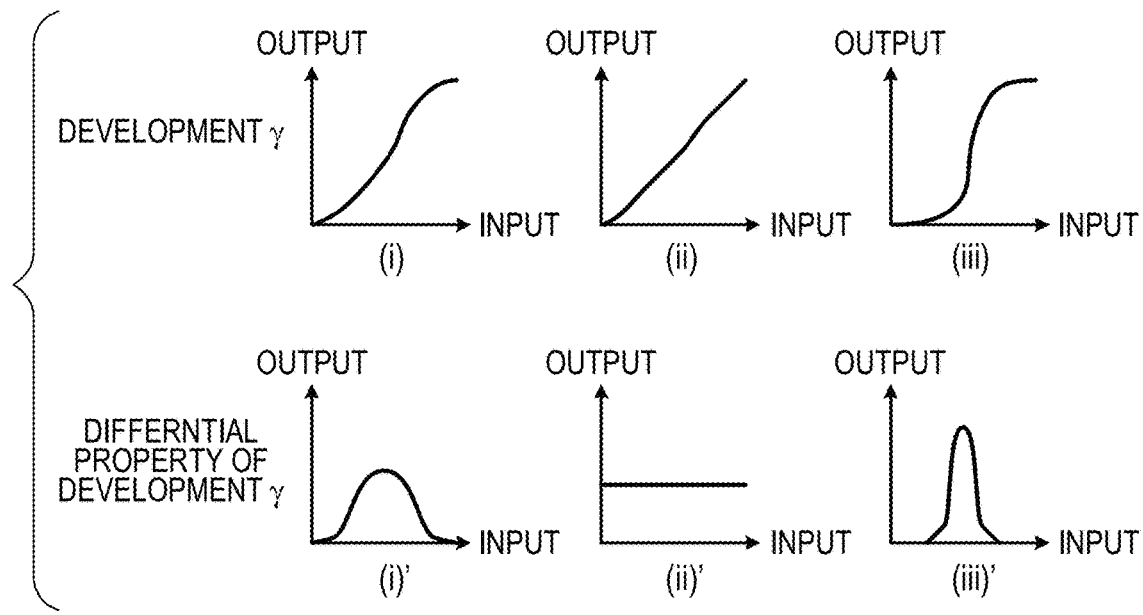
FIG. 9A is each a graph for showing feature amount extraction of developing characteristics according to the first embodiment.

In the embodiment, when the feature amount of the development $\gamma$ is extracted, a differential function of the development $\gamma$ is determined, and the determined differential function is expressed by a normal distribution in which an error of mean square becomes minimum. Then, a standard deviation of the normal distribution is determined by calculation. FIG. 9A is graphs for showing tone characteristics table (LUT) (i) to (iii) which are three developments $\gamma$ having different feature amounts, and differential properties (i)' to (iii)' of the developments $\gamma$ corresponding to the tone characteristics (i) to (iii). In all of the graphs, the horizontal axis represents an input, and the vertical axis represents an output. A differential of the graph showing the tone characteristics in the embodiment represents a general normal distribution represented by Expression (3).

$$Xo = \frac{1}{\sqrt{2\pi\sigma^2}} \exp\left(-\frac{(Xi-\mu)^2}{2\sigma^2}\right) \qquad \text{Expression (3)}$$

where Xo represents an output, Xi represents an input, μ represents an average value, and σ2 represents a variance. The CPU 303 determines the average value μ and the standard deviation σ at which an error from the functions of the differential properties (i)' to (iii)' becomes minimum by a least-square method. In the embodiment, the standard deviation σ is defined as a feature amount of the tone characteristics.

In Step S804, the CPU 303 determines whether or not the feature amount extracted in Step S803 falls outside of a predetermined range. Specifically, the CPU 303 determines whether or not the standard deviation σ determined in Step S803 is less than a predetermined threshold value σth. When the CPU 303 determines in Step S804 that the feature amount falls within the predetermined range, the CPU 303 terminates the adjusting processing for a correction amount of an optical face tangle error. Specifically, when the CPU 303 determines that the standard deviation σ is equal to or more than the predetermined threshold value σth, the CPU 303 considers the development γ to be normal. When the CPU 303 determines in Step S804 that the feature amount falls outside of the predetermined range, that is, the determined standard deviation σ is less than the predetermined threshold value σth, the CPU considers the development γ to be abnormal and proceeds to the processing in Step S805.

In Step S805, the CPU 303 outputs patches for adjustment. For example, in FIG. 9A, the standard deviation σ of the tone characteristic (i) is larger and the standard deviation σ of the tone characteristic (iii) is smaller as compared to that of the tone characteristic (ii). In the embodiment, when the standard deviation σ is less than the predetermined threshold value σth, the development γ is determined to be abnormal. However, for example, the development γ may be determined to be abnormal also in a substantially linear case. Further, as the feature amount, any numerical value replacing the standard deviation σ, e.g., a maximum value of a differential value, may be used for the determination in Step S804.

(Patches for Adjustment)

Figure 9B:
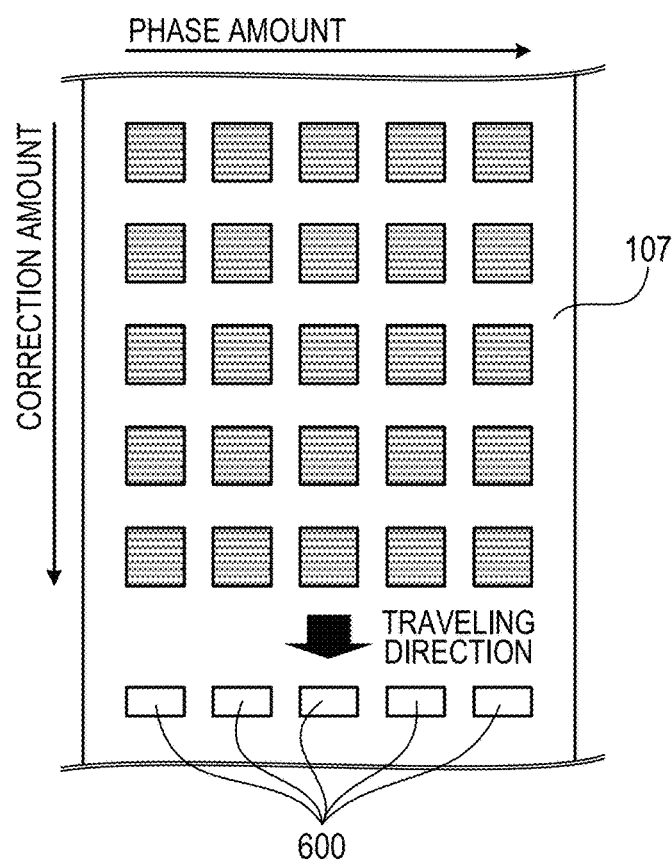
FIG. 9B is a view for illustrating patches for adjusting a correction amount of an optical face tangle error.

Patches for adjustment to be output in Step S805 will be described with reference to FIG. 9B. FIG. 9B is a view for illustrating an example of patches for adjustment formed on the intermediate transfer belt 107. In FIG. 9B, each patch is formed with a predetermined correction amount and a predetermined phase amount. In FIG. 9B, the patches are formed in combination of each step of changing a correction amount in the sub-scanning direction (traveling direction of FIG. 9B) and changing a phase amount of the rotary polygon mirror 204 in the main scanning direction (direction orthogonal to the traveling direction of FIG. 9B). In the embodiment, the optical face tangle error amount in the main scanning direction is set to be constant. In the traveling direction of each patch, sensors 600 configured to read density are arranged so as to be opposed to the patches. The sensors 600 are two-dimensional sensors, and in Step S806, the CPU 303 uses the sensors 600 to read the density of each conveyed patch. In Step S807, the CPU 303 analyzes a correction residual error by, for example, fast Fourier transformation (hereinafter referred to as "FFT"). The analysis of a residual error by FFT or the like is known, and hence the description thereof is omitted.

In Step S808, the CPU 303 compares numerical values analyzed for each patch illustrated in FIG. 9B, to thereby determine a patch having an amplitude of a minimum value. With this, the correction amount and the phase amount used in the determined patch are stored in a RAM (not shown) or the like, and the adjusting processing for a correction amount of an optical face tangle error is terminated. Thus, when the tone correction table (LUT) updated in Step S610 of FIG. 5 is a predetermined dither (dither C), and the tone correction table (LUT) (development γ) of the dither C has been changed (falls outside of the predetermined range), it is necessary to adjust the correction amount of an optical face tangle error to be used in optical face tangle error correction processing described later. The correction amount and the phase amount determined in Step S808 are used not only for optical face tangle error correction in the case of using the predetermined dither (dither C) but also for optical face tangle error correction in the case of using another dither (dither A, dither B).

As described above, when the CPU 303 determines that the development γ is abnormal, the CPU 303 forms a plurality of patches having a plurality of different adjustment amounts (correction amount and phase amount) and determines one adjustment amount from the plurality of adjustment amounts based on the results obtained by detecting the plurality of patches with the sensors 600. In the processing from Step S804 to Step S808, the CPU 303 also serves as an adjustment unit.

(Optical Face Tangle Error Correction Processing)

Figure 10:
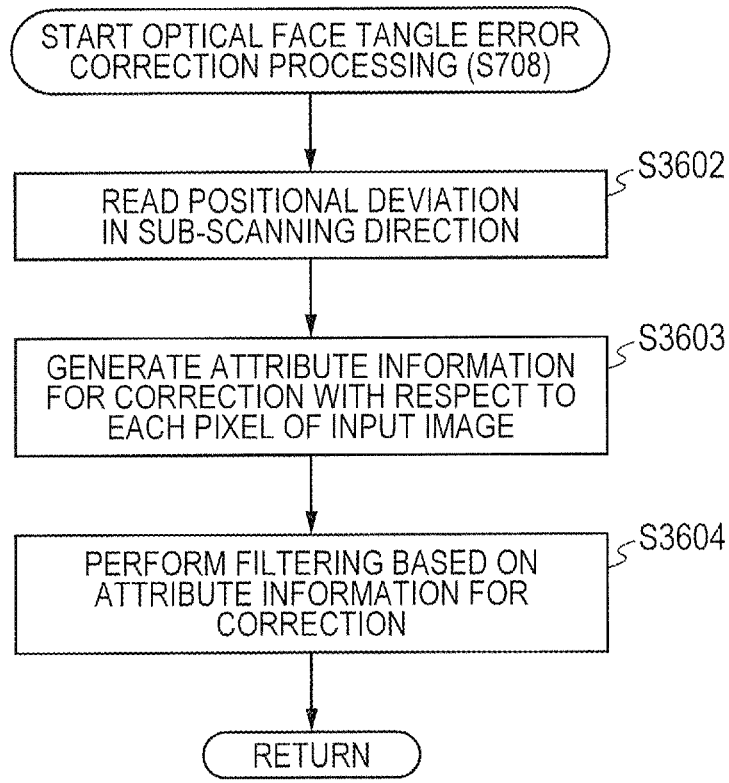
FIG. 10 is a flowchart for illustrating optical face tangle error correction processing according to the first embodiment.

In the page processing in Step S603 of FIG. 5, the optical face tangle error correction processing performed in Step S708 of FIG. 7 will be described in detail. In the embodiment, the CPU 303 is configured to correct image data based on the positional deviation amounts in the sub-scanning direction of the scanning lines formed by laser beams and output the corrected image data to the laser drive circuit 304. Now, a flowchart of FIG. 10 will be described below. FIG. 10 is a flowchart for illustrating correction processing for correcting uneven image density and banding caused by the positional deviation in the sub-scanning direction. In Step S3602, the CPU 303 reads the positional deviation amount in the sub-scanning direction stored in the memory 302. Specifically, the CPU 303 reads the position information X1 to X7 of the scanning lines LD2 to LD8 and the position information Y1 to Y5 of the first to fifth faces of the rotary polygon mirror 204 shown in Table 1 from the memory 302. The CPU 303 performs the adjusting processing for a correction amount of an optical face tangle error in Step S611 of FIG. 5, specifically, reads the correction amount and the phase amount for correcting a change in the development γ stored in the RAM (not shown) or the like in Step S808 of FIG. 8. The CPU 303 adjusts the position information Y1 to Y5 of an optical face tangle error of the rotary polygon mirror 204 based on the read correction amount and phase amount. In the embodiment, the CPU 303 corrects the pixel position of the input image data in the sub-scanning direction based on the position deviation amounts (X1 to X7, Y1 to Y5 after adjustment) in the sub-scanning direction, and then outputs image data, that is density, through the filtering.

(State of Positional Deviation of Scanning Line)

The state of positional deviation of a scanning line can be roughly classified into four cases. First, regarding the state of positional deviation, there is a case (a) in which the position of a scanning line (hereinafter referred to as "scanning position") on the photosensitive drum 102 is shifted in an advance direction with respect to an ideal scanning position, and a case (b) in which the scanning position on the photosensitive drum 102 is shifted in a return direction with respect to the ideal scanning position. Further, regarding the state of positional deviation, there is a case (c) in which the intervals between the scanning positions on the photosensitive drum 102 are dense with respect to the intervals between the ideal scanning positions, and a case (d) in which the intervals between the scanning positions on the photosensitive drum 102 are sparse with respect to the intervals between the ideal scanning positions. Specific examples of the state of positional deviation in the sub-scanning direction are illustrated in FIG. 11A, FIG. 11B, FIG. 11C, and FIG. 11D. In FIG. 11A to FIG. 11D, the broken lines represent scanning positions, and in FIG. 11A to FIG. 11D, (1) to (5) represent the order of scanning. In the embodiment, eight beams are used for scanning simultaneously, but description is given on the assumption that the order is allocated to each beam arranged successively in the sub-scanning direction. Each column on the left side of FIG. 11A to FIG. 11D represents ideal scanning positions, and each column on the right side represents scanning positions on the photosensitive drum 102. S1 to S5 represent positional deviation amounts from the ideal scanning positions with respect to scanning numbers (1) to (5). The unit of a positional deviation amount is represented based on the case where the ideal beam interval (21.16 µm at 1,200 dpi) is defined as 1, and the advance direction of a laser beam in the sub-scanning direction (hereinafter simply referred to as "advance direction") is set to a positive value. Further, the return direction of the laser beam in the sub-scanning direction (hereinafter simply referred to as "return direction") is set to a negative value. Further, in order to describe the state of an image, each pixel arranged in the sub-scanning direction is represented by a circle on the scanning line. The shading of the circle represents density.

Figure 11A:
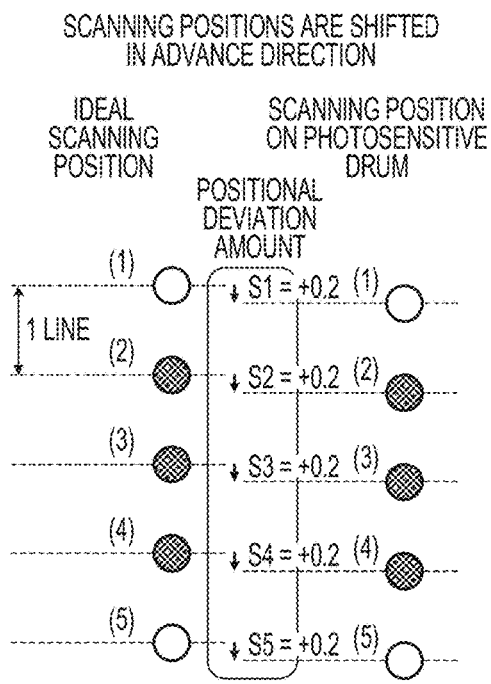
FIGS. 11A, 11B, 11C and 11D are each a diagram for illustrating positional deviation of pixels for each classification according to the first embodiment.
Figure 11B:
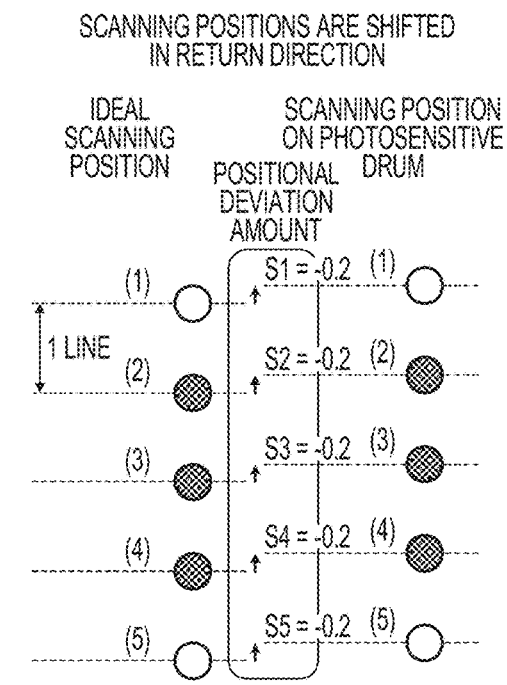

FIG. 11A is an illustration of an example in which the scanning positions on the photosensitive drum 102 are shifted by 0.2 uniformly in the advance direction from the ideal scanning positions. The positional deviation amount as illustrated in FIG. 11A is hereinafter referred to as a shift amount of +0.2. FIG. 11B is an illustration of an example in which the scanning positions on the photosensitive drum 102 are shifted by 0.2 uniformly in the return direction from the ideal scanning positions. The positional deviation amount as illustrated in FIG. 11B is hereinafter referred to as a shift amount of −0.2. In FIG. 11A and FIG. 11B, the scanning positions are shifted uniformly, and hence the interval between the scanning positions on the photosensitive drum 102 is 1 in both the cases.

Figure 11C:
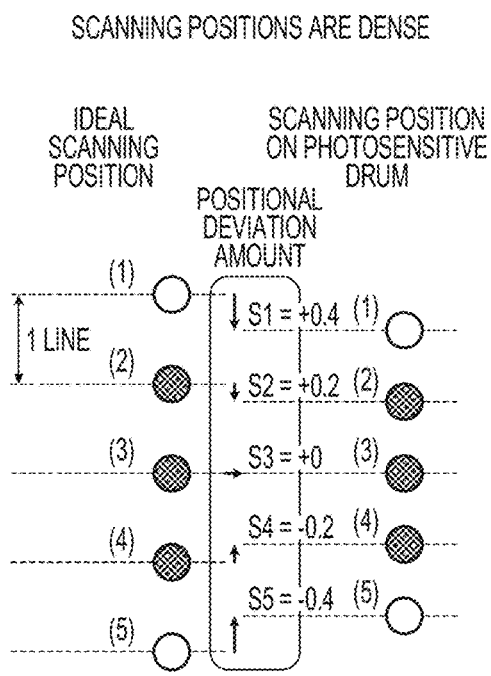

In FIG. 11C, the positional deviation amount is 0 at a predetermined scanning position on the photosensitive drum 102. However, as the scanning position returns backward from the scanning position of the positional deviation amount of 0, the positional deviation amount in the advance direction increases, and as the scanning position proceeds forward from the scanning position of the positional deviation amount of 0, the positional deviation amount in the return direction increases. For example, S3 is +0 in the scanning number (3), but S2 is +0.2 in the scanning number (2), S1 is +0.4 in the scanning number (1), S4 is −0.2 in the scanning number (4), and S5 is −0.4 in the scanning number (5). In FIG. 11C, the interval between the scanning positions is 0.8, which is smaller than 1. The state of positional deviation as illustrated in FIG. 11C is hereinafter referred to as being dense at an interval of a (1−0.2) line.

Figure 11D:
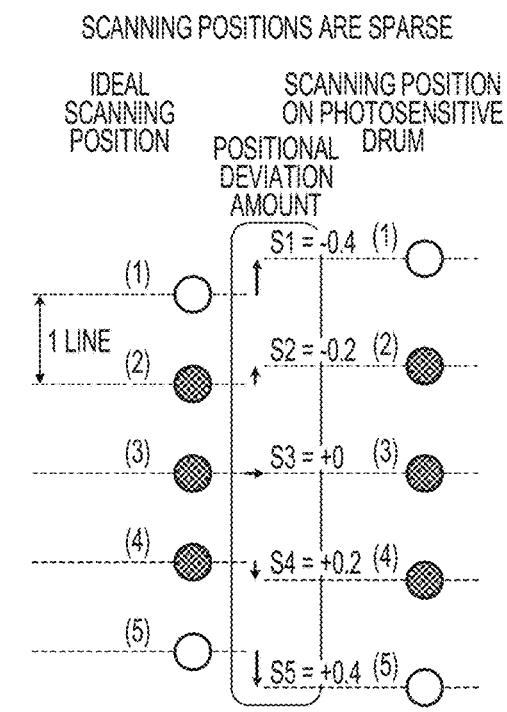

In FIG. 11D, the positional deviation amount is 0 at a predetermined scanning position on the photosensitive drum 102. However, as the scanning position returns backward from the scanning position of the positional deviation amount of 0, the positional deviation amount in the return direction increases, and as the scanning position proceeds forward from the scanning position of the positional deviation amount of 0, the positional deviation amount in the advance direction increases. For example, S3 is +0 in the scanning number (3), but S2 is −0.2 in the scanning number (2), S1 is −0.4 in the scanning number (1), S4 is +0.2 in the scanning number (4), and S5 is +0.4 in the scanning number (5). In FIG. 11D, the interval between the scanning positions is 1.2, which is larger than 1. The state of positional deviation as illustrated in FIG. 11D is hereinafter referred to as being sparse at an interval of a (1+0.2) line.

In the dense state as illustrated in FIG. 11C, positional deviation occurs, and in addition, the intervals between scanning positions are dense to cause pixels to be arranged densely on the photosensitive drum 102, with the result that a pixel value per predetermined area increases, to thereby increase density. In contrast, in the sparse state as illustrated in FIG. 11D, positional deviation occurs, and in addition, the intervals between scanning positions are sparse to cause pixels to be arranged sparsely on the photosensitive drum 102, with the result that a pixel value per predetermined area decreases, to thereby decrease density. In an electrophotographic process, a shading difference may be further emphasized due to a relationship between the depth of a latent image potential and development characteristics. Further, when the dense or sparse state occurs alternately as illustrated in FIG. 11C and FIG. 11D, a periodic shading causes moire, which is liable to be detected visually even at the same amount depending on a space frequency.

Referring back to the flowchart of FIG. 10, in Step S3603, the CPU 303 generates attribute information for correction of each pixel of an input image with the correction value setting portion 506. In the embodiment, the pixel position in the sub-scanning direction of an input image is subjected to coordinate transformation in advance and interpolated, thereby being capable of correcting positional deviation and correcting local shading simultaneously while maintaining density of the input image. The attribute information for correction specifically refers to a correction value C described later.

(Coordinate Transformation)

A method for coordinate transformation according to the embodiment will be described with reference to FIG. 12A to FIG. 14B. In each graph of FIG. 12A to FIG. 14B, a horizontal axis represents a pixel number "n", and a vertical axis represents a pixel position (which is also a scanning position) "y" (y' after the coordinate transformation) in the sub-scanning direction, with the unit being a line. Further, FIG. 12A, FIG. 12B, FIG. 14A, and FIG. 14B correspond to FIG. 11A to FIG. 11D, respectively. Each graph on the left side of FIG. 12A, FIG. 12B, FIG. 14A, and FIG. 14B represents the state before the coordinate transformation, and each graph on the right side thereof represents the state after the y-axis coordinate transformation. Square dots plotted in each graph represent scanning positions on the photosensitive drum 102, and circular dots therein represent ideal scanning positions.

(Case of being Shifted in Advance Direction and Return Direction)

Figure 12A:
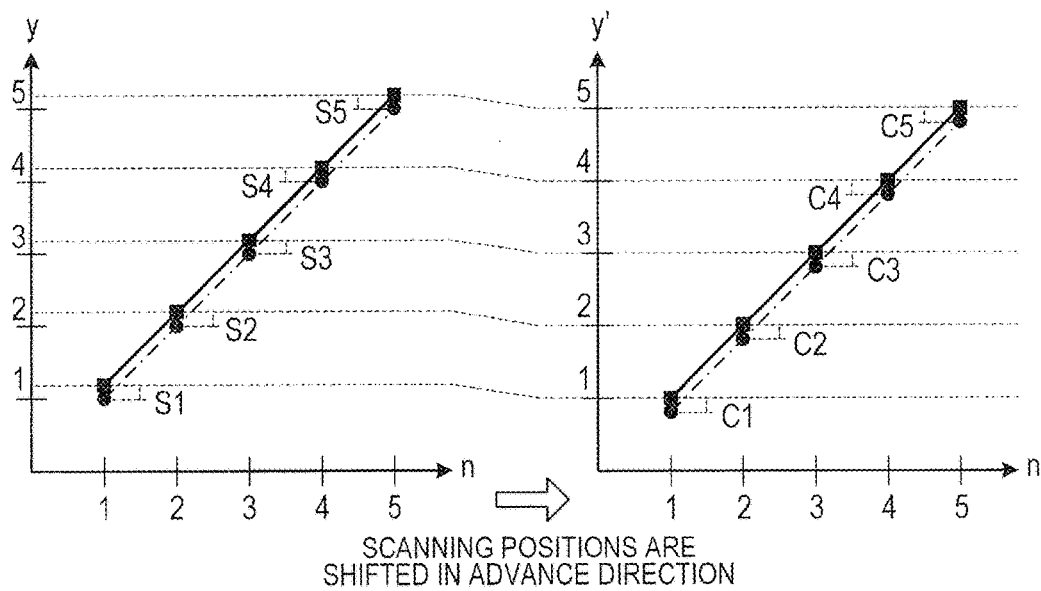
FIGS. 12A and 12B are each a graph for showing coordinate transformation of pixel positions in a sub-scanning direction according to the first embodiment.

The graph on the left side of FIG. 12A is first described. In the graph before the coordinate transformation, the ideal scanning position plotted with the circular dots is a position in which, for example, a pixel position "y" in the sub-scanning direction is 2 with respect to the pixel number 2. Thus, the y-coordinate of the pixel position "y" is equal to that of the pixel number "n", and the ideal scanning positions are represented by a straight line (indicated by the alternate long and short dash line) with a gradient of 1. The straight alternate long and short dash line is represented by Expression (4).

$$y=n \qquad \text{Expression (4)}$$

As illustrated in FIG. 11A, the scanning positions plotted with the square dots are shifted by S (=0.2) line in the advance direction (+direction of y-axis) with respect to the ideal scanning positions plotted with the circular dots. Therefore, the scanning positions plotted with the square dots are represented by a straight line (indicated by the solid line) offset with the gradient being 1, which is represented by Expression (5).

$$y=n+S \qquad \text{Expression (5)}$$

In the embodiment, the coordinate transformation is performed so that the actual scanning positions are transformed into the ideal scanning positions. Therefore, in the example illustrated in FIG. 12A, it is only necessary that the coordinate transformation be performed with the use of Expression (6). In Expression (6), C represents a correction amount.

$$y'=y+C \qquad \text{Expression (6)}$$

Thus, the correction amount C is represented by a shift amount S and Expression (7).

$$C=-S \qquad \text{Expression (7)}$$

Through Expression (6) of the coordinate transformation and Expression (7) for determining the correction amount C, Expressions (4) and (5) are converted as represented by Expressions (8) and (9), respectively.

$$y'=y+C=n+(-S)=n-S \qquad \text{Expression (8)}$$

$$y'=y+C=(n+S)+C=(n+S)+(-S)=n \qquad \text{Expression (9)}$$

Figure 12B:
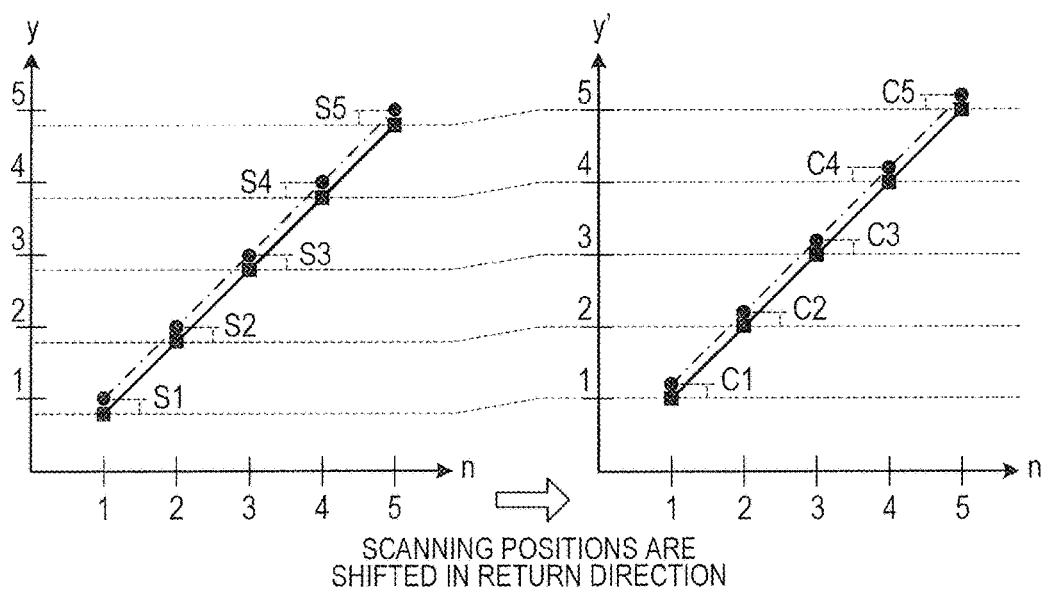

In FIG. 12B, when the shift amount S is defined as −0.2, Expression (9) similarly holds from Expression (4), and a similar description to that of FIG. 12A can be given. As illustrated in FIG. 12A and FIG. 12B, when the scanning lines are not sparse or dense, and are shifted in the advance direction or the return direction, a straight line has a predetermined gradient before and after the coordinate transformation.

(Case in which Dense or Sparse State Occurs)

Figure 13A:
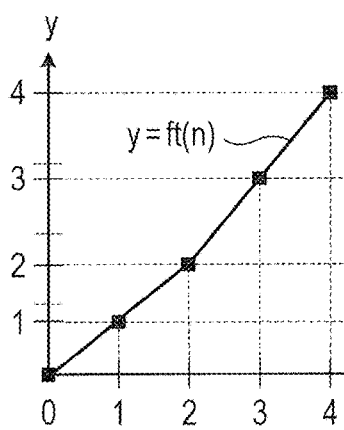
FIGS. 13A, 13B, 13C and 13D are each a graph for showing coordinate transformation of pixel positions in the sub-scanning direction according to the first embodiment.

Now, the coordinate transformation will be described, which is also applicable to the cases in FIG. 14A and FIG. 14B in which the scanning positions become dense or sparse, and the cases of combinations of FIG. 12A, FIG. 12B, FIG. 14A, and FIG. 14B in which a shift and a dense or sparse state occur. FIG. 13A is an illustration of a relationship between the pixel number and the scanning position. A horizontal axis represents a pixel number "n", and a vertical axis "y" represents a scanning position in the sub-scanning direction. Square dots are plotted as the scanning positions on the photosensitive drum 102. In FIG. 13A, the case is described in which the scanning lines are dense on the photosensitive drum 102 within a range of the pixel number of n≤2, and the scanning lines are sparse on the photosensitive drum 102 within a range of the pixel number of n≥2.

As illustrated in FIG. 13A, when the scanning lines are dense within the range of the pixel number of n≤2, and are sparse within the range of the pixel number of n≥2, the gradient of a straight line within the range of the pixel number of n≤2 is different from that of a straight line within the range of the pixel number of n≥2, and the straight line has a curved shape at the pixel number of n=2. In FIG. 13A, a function indicating a change in scanning positions passing through the square dots is defined as ft(n) and is represented by the solid line. The function ft(n) representing the scanning positions is represented by Expression (10).

$$y=ft(n) \qquad \text{Expression (10)}$$

Next, when a function after the coordinate transformation of the y-axis that represents the scanning positions in the sub-scanning direction is defined as ft'(n), the function ft'(n) representing the scanning positions after the coordinate transformation is represented by Expression (11).

$$y'=ft'(n) \qquad \text{Expression (11)}$$

In the embodiment, the coordinate transformation is performed by expanding or contracting the y-axis or shifting the y-axis so that the scanning positions after the coordinate transformation become uniform. Therefore, the function ft'(n) representing the scanning positions after the coordinate transformation satisfies the condition represented by Expression (12).

$$ft'(n)=n \qquad \text{Expression (12)}$$

Expression (12) means that, for example, a pixel position y' (=ft'(2)) in the sub-scanning direction after the coordinate transformation becomes 2 with respect to the pixel number 2.

Figure 13B:
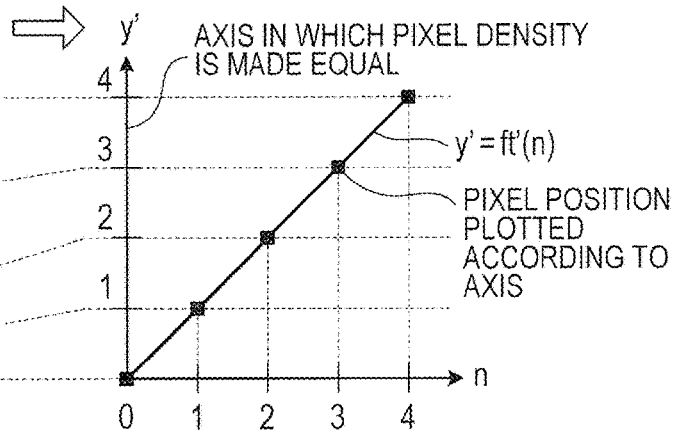
Figure 13C:
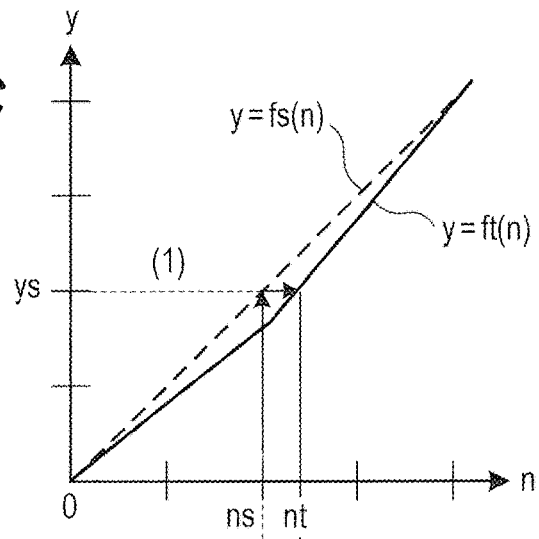
Figure 13D:
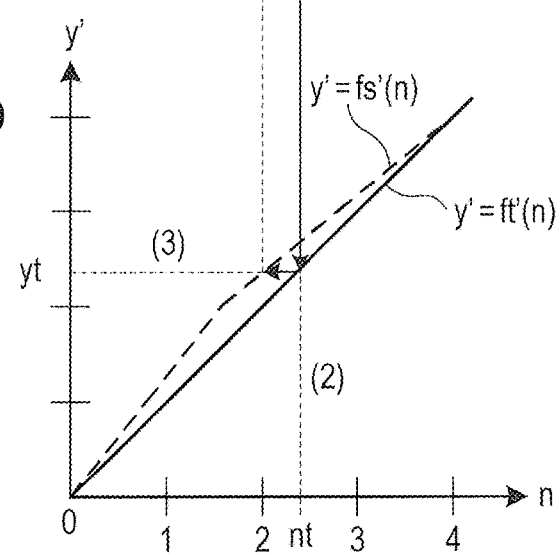

The broken lines connecting FIG. 13A and FIG. 13B to each other represent the correspondence from an original coordinate position of the y-axis to a coordinate position of the y'-axis after the coordinate transformation from the left to the right, and indicate a state in which a lower half (corresponding to n≤2) of the y-axis expands, and an upper half (corresponding to n≥2) contracts before and after the coordinate transformation. A procedure for determining a coordinate after the coordinate transformation of each pixel of input image data through the coordinate transformation of FIG. 13A and FIG. 13B will be described with reference to FIG. 13C and FIG. 13D. In the same manner as in FIG. 13A and FIG. 13B, a horizontal axis in FIG. 13C and FIG. 13D represents a pixel number "n", and a vertical axis "y" (or y') represents scanning positions in the sub-scanning direction. FIG. 13C is an illustration before the coordinate transformation, and FIG. 13D is an illustration after the coordinate transformation. A relationship between the pixel number "n" and the coordinate position "y" of the input image data will be described below. First, the broken line of FIG. 13C represents a function fs(n) representing ideal scanning positions before the coordinate transformation and is represented by Expression (13).

$$y=fs(n) \qquad \text{Expression (13)}$$

Further, in the embodiment, the interval between the pixels in the sub-scanning direction of the input image data is uniform, and hence the function fs(n) is represented by Expression (14).

$$fs(n)=n \qquad \text{Expression (14)}$$

A scanning position of the y'-coordinate after the coordinate transformation of a pixel number of interest "ns" of the input image data is determined through three steps described below. In the first step, when the y-coordinate of an ideal scanning position corresponding to the pixel number "ns" of the input image data is defined as "ys", "ys" can be determined by Expression (15).

$$ys = fs(ns) \qquad \text{Expression (15)}$$

A pixel number "nt" in which the scanning position before the coordinate transformation is the same on the photosensitive drum 102 (solid line) is determined ((1) of FIG. 13C). The scanning position on the photosensitive drum 102 is represented by the function y=ft(n), and a relationship of ys=ft(nt) holds. When an inverse function of the function ft(n) is defined as $ft^{-1}(y)$, the pixel number "nt" is represented by Expression (16).

$$nt = ft^{-1}(ys) \qquad \text{Expression (16)}$$

In the second step, the y'-coordinate after the coordinate transformation (defined as "yt") corresponding to the pixel number "nt" of the scanning position on the photosensitive drum 102 is determined by Expression (17) with the use of the function ft'(n) after the coordinate transformation ((2) of FIG. 13D).

$$yt = ft'(nt) \qquad \text{Expression (17)}$$

The pixel number ns holds even when any number is selected, and hence an expression for determining the position "yt" of the y'-coordinate after the coordinate transformation based on the pixel number "ns" corresponds to the function fs'(n) for determining the y'-coordinate by calculation based on the pixel number "n" of the input image data. Thus, a general expression represented by Expression (18) is derived from Expressions (15) to (17). A function indicating the ideal scanning position represented by the broken line after the coordinate transformation is represented by y'=fs'(n) ((3) of FIG. 13D).

$$yt = fs'(ns) = ft'(nt) = ft'(ft^{-1}(ys)) = ft'(ft^{-1}(fs(ns)))$$

"ns" is generalized into "n" to obtain Expression (18).

$$fs'(n) = ft'(ft^{-1}(fs(n))) \qquad \text{Expression (18)}$$

Further, Expression (14) and Expression (12) in which the pixel interval of the input image data and the interval of the scanning positions after the coordinate transformation are set to be uniform, with the distance of 1, are substituted into Expression (18). Then, Expression (18) is represented by Expression (19) with the use of the inverse function $ft^{-1}(n)$ of the function ft(n) for deriving the scanning position from the pixel number "n".

$$fs'(n) = ft^{-1}(n) \qquad \text{Expression (19)}$$

Expression (5) in which the scanning positions are shifted uniformly in the advance direction and the return direction as illustrated in FIG. 12A and FIG. 12B, and Expression (8) for determining a position after the coordinate transformation of the input image data also have an inverse function relationship, and it can be confirmed that Expression (19) holds. Further, when applied to the case in which the dense or sparse state of the scanning positions occurs as illustrated in FIG. 14A and FIG. 14B, the function "y" representing scanning positions before the coordinate transformation is represented by Expression (20) when the function "y" is a straight line with a gradient "k", passing through (n0, y0).

$$fs(n) = k \times (n - n0) + y0 \qquad \text{Expression (20)}$$

In order to determine a pixel position after the coordinate transformation of the y-axis of the input image data, it is only necessary that an inverse function $((1/k) \times (y-y0)+n0)$ be determined by Expressions (18) and (19), and the pixel number "n" be substituted into the inverse function, and hence Expression (21) is derived.

$$y' = (1/k) \times (n - y0) + n0 \qquad \text{Expression (21)}$$

Figure 14A:
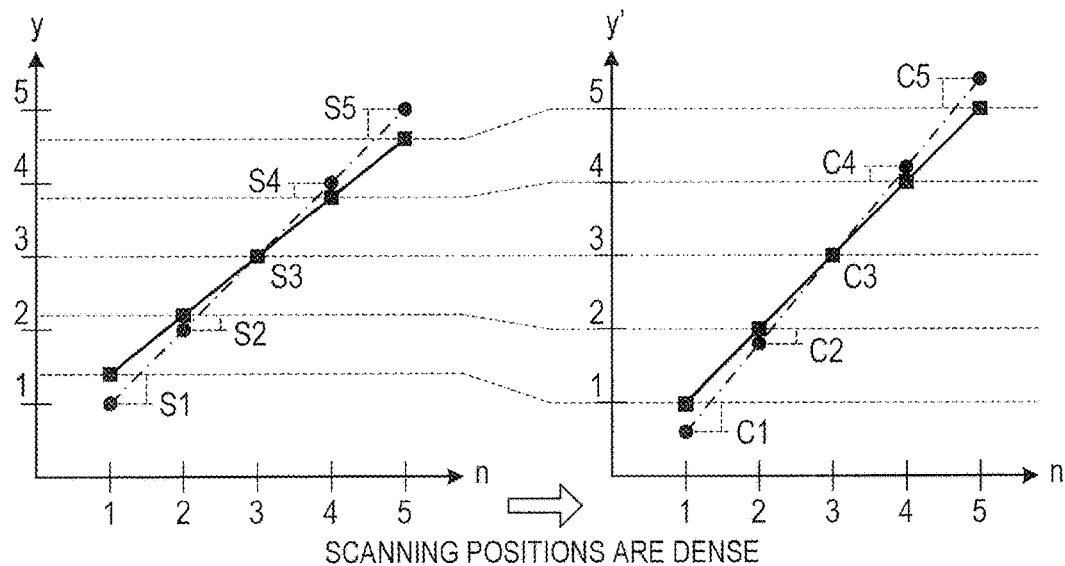
FIGS. 14A and 14B are each a graph for showing coordinate transformation of pixel positions in the sub-scanning direction according to the first embodiment.
Figure 14B:
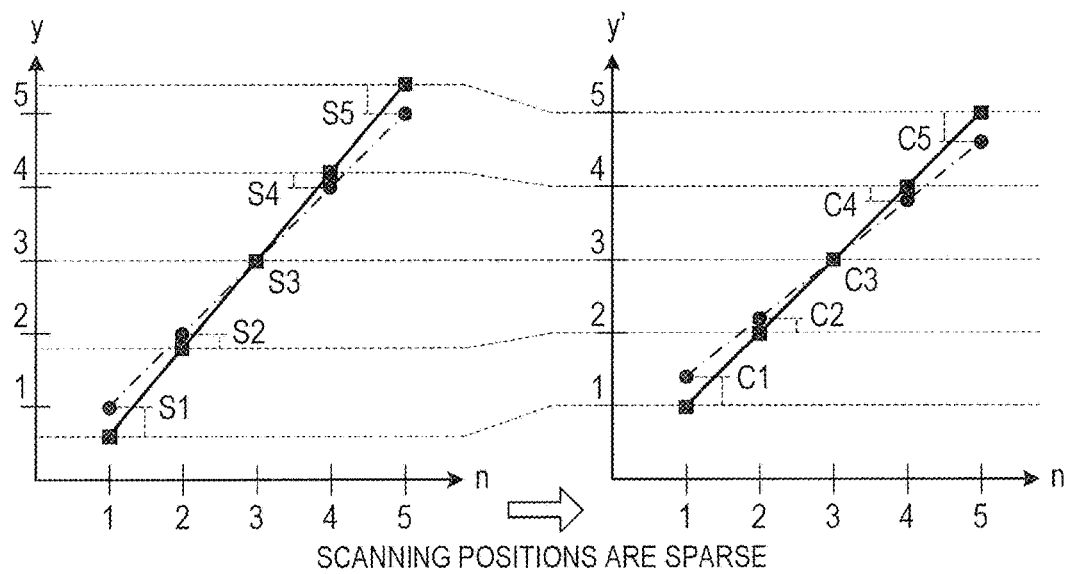

When the intervals between the scanning lines illustrated in FIG. 14A are dense, and the intervals between the scanning lines illustrated in FIG. 14B are sparse, the positions of the scanning lines on the photosensitive drum 102 after the coordinate transformation can be represented by Expression (21) in both the cases. Further, a correction value Cn of the pixel number "n" is determined by Cn=fs'(n)−fs(n).

Specifically in FIG. 14A, n0=y0=3 and k=0.8 are satisfied, and Expression (22) is obtained.

$$fs'(n) = (1/0.8) \times (n-3) + 3 \qquad \text{Expression (22)}$$

For example, in the pixel number 3, fs'(3)=3.00 is satisfied, and the correction value C3 is 0.00 (=3.00−3.00). Further, in the pixel number 5, fs'(5)=5.50 is satisfied, and the correction value C5 is +0.50 (=+5.50−5.00). The correction values C1 to C5 when the scanning positions are dense are illustrated in FIG. 16C.

Further, in FIG. 14B, n0=y0=3, and k=1.2 are satisfied, and Expression (23) is obtained.

$$fs'(n) = (1/1.2) \times (n-3) + 3 \qquad \text{Expression (23)}$$

For example, in the pixel number 3, fs'(3)=3.000 is satisfied, and the correction value C3 is 0.000 (=3.000−3.000). Further, in the pixel number 5, fs'(5)=4.667 is satisfied, and the correction value C5 is −0.333 (=4.667−5.000). The correction values C1 to C5 when the scanning positions are sparse are illustrated in FIG. 16D.

Further, even when a dense or sparse state and a shift are mixed in the scanning lines, an ideal scanning position after the coordinate transformation can be determined with the use of Expression (18) or (19). The correction value setting portion 506 is configured to subject an ideal scanning position to the coordinate transformation based on a positional deviation amount to determine the correction value Cn, and output information on the correction value Cn to the filter coefficient setting portion 504.

(Filtering)

In the embodiment, the filtering is performed in order to generate correction data. In the embodiment, the filtering portion 501 is configured to perform the filtering through a convolution operation based on the following filter function. That is, the filtering portion 501 performs the filtering based on a positional relationship between the pixel positions in the sub-scanning direction of pixels obtained by correcting scanning positions in the sub-scanning direction of pixels of the input image data, and the positions of pixels in the sub-scanning direction having an interval between scanning lines transformed uniformly by the coordinate transformation. A pixel before the filtering is also referred to as an input pixel, and a pixel after the filtering is also referred to as an output pixel. Further, a pixel before the filtering is a pixel subjected to the above-mentioned coordinate transformation.

Figure 15A:
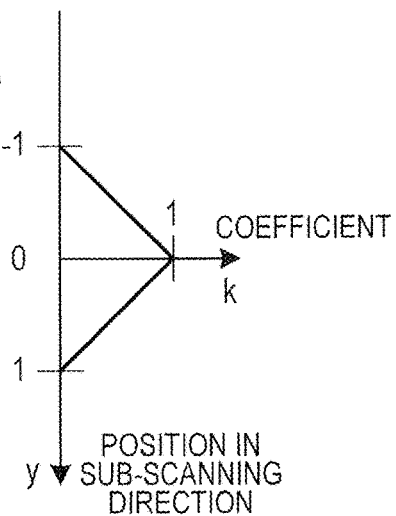
FIGS. 15A, 15B and 15C are each a graph for showing a convolution function to be used in filtering according to the first embodiment.
Figure 15B:
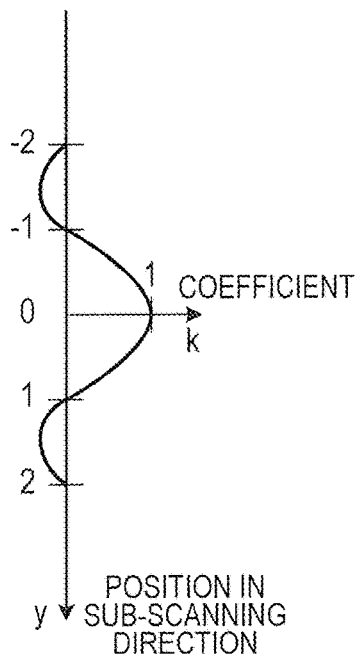
Figure 15C:
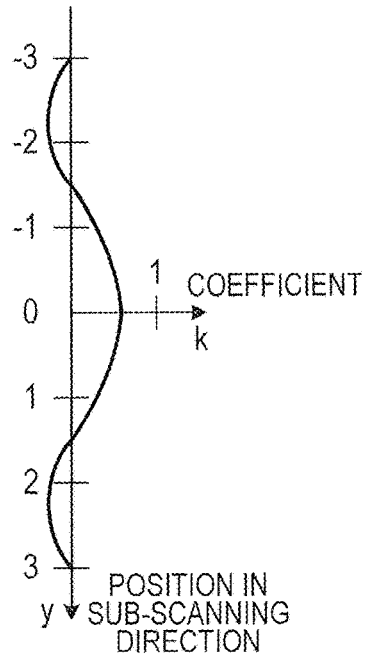

The convolution function according to the embodiment can be selected from linear interpolation illustrated in FIG. 15A, and bicubic interpolation illustrated in FIG. 15B and FIG. 15C. The filter function output portion 505 outputs information on the convolution function used in the filtering to the filter coefficient setting portion 504 as information of the table, for example. In FIG. 15A to FIG. 15C, a vertical axis "y" represents a position in the sub-scanning direction, with a unit being a pixel, and a horizontal axis "k" represents a magnitude of a coefficient. Although the unit of the vertical axis "y" is set to a pixel, a line may be used as a unit because the sub-scanning direction is illustrated.

The expression of FIG. 15A is represented by Expression (24).

$$k = y + 1 \quad (-1 \le y \le 0)$$
$$k = -y + 1 \quad (0 < y \le 1)$$
$$0 \quad (y < -1, y > 1)$$

Expression (24)

Expressions of FIG. 15B and FIG. 15C are represented by the following two expressions.

$$bicubic(t) = \begin{cases} (a+2)|t|^3 - (a+3)|t|^2 + 1 & (|t| \le 1) \\ a|t|^3 - 5a|t|^2 + 8a|t| - 4a & (1 < |t| \le 2) \\ 0 & (2 < |t|) \end{cases}$$

Expression (25)

$$k = bicubic\left(\frac{y}{w}\right)/w$$

Expression (26)

In the embodiment, "a" is set to −1, and "w" is set to 1 in FIG. 15B and set to 1.5 in FIG. 15C, but "a" and "w" may be adjusted in accordance with the electrophotographic characteristics of each image forming apparatus. The filter coefficient setting portion 504 is configured to output a coefficient ("k" described later) to be used in the filtering to the filtering portion 501 based on the information on the filter function obtained from the filter function output portion 505 and the information on the correction value C output from the correction value setting portion 506.

Figure 15D:
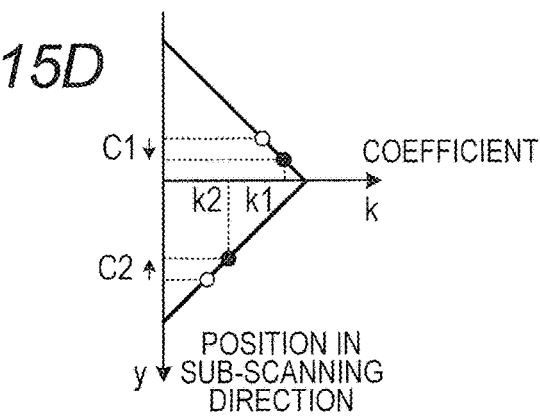
FIG. 15D is a graph for showing a correction value and a coefficient.

Now, description is given with reference to FIG. 15D. In FIG. 15D, a horizontal axis represents a coefficient "k" to be used in the filtering, and a vertical axis represents a position in the sub-scanning direction. When the filtering portion 501 receives the correction value Cn from the correction value setting portion 506, the filtering portion 501 determines a coefficient "kn" corresponding to the correction value Cn with the use of the filter function input from the filter function output portion 505. White circles of FIG. 15D represent coefficients before the coordinate transformation. Further, in FIG. 15D, it is illustrated that coefficients k1 and k2 were set with respect to a correction value C1 and a correction value C2, respectively, as coefficients "kn" to be used in the filtering (black circles). In the embodiment, the same convolution function is applied irrespective of whether the input image data is dense or sparse, and sampling is performed at an ideal scanning position, to thereby store density per predetermined area of the input image data.

(Specific Example of Filtering)

A specific example of performing the filtering with the use of the convolution operation with a filter function by linear interpolation of Expression (24) based on a coordinate position after the coordinate transformation of the embodiment will be described with reference to FIG. 16A, FIG. 16B, FIG. 16C, and FIG. 16D. The filtering using the convolution operation is performed by the filtering portion 501. FIG. 16A to FIG. 16D correspond to FIG. 11A to FIG. 11D. Each column on the left side of FIG. 16A to FIG. 16D represents input pixels after the above-mentioned coordinate transformation. The input pixel is a pixel of the image data subjected to the dither processing in Step S707 of FIG. 7, and also includes a pixel having a density value of a halftone. Further, each column on the right side of FIG. 16A to FIG. 16D represents scanning positions on the photosensitive drum 102 after the above-mentioned coordinate transformation. That is, the scanning positions in each column on the right side of FIG. 16A to FIG. 16D have been subjected to the coordinate transformation so as to have a uniform interval and a distance of 1.

More specifically, the scanning positions in the sub-scanning direction of input pixels after the coordinate transformation are represented by a straight line (y'=fs'(n)) indicated by the alternate long and short dash line of the graph after the coordinate transformation illustrated on the right side of FIG. 12A, FIG. 12B, FIG. 14A, and FIG. 14B. The scanning positions on the photosensitive drum 102 after the coordinate transformation are represented by a straight line (y'=fs'(n)) indicated by the solid line of the graph after the coordinate transformation illustrated on the right side of FIG. 12A, FIG. 12B, FIG. 14A, and FIG. 14B. For example, in FIG. 12A, the shift amount is +0.2 (=S), and hence fs'(n)=y−0.2=n−0.2 is satisfied after the coordinate transformation.

Further, in FIG. 16A to FIG. 16D, the magnitude of a pixel value, that is, a density value is represented by shading of circles. Further, numbers in parentheses indicate numbers of scanning lines, and are the same as the pixel numbers illustrated in FIG. 11A to FIG. 11D. In each graph at the center of FIG. 16A to FIG. 16D, a horizontal axis represents density, and a vertical axis represents a position in the sub-scanning direction. The convolution operation involves developing waveforms W (W1 to W5 with respect to the pixels (1) to (5)) obtained by multiplying the filter function based on each coordinate position of an input image (FIG. 15A) by a pixel value, and adding the waveforms W by superimposing.

Figure 16A:
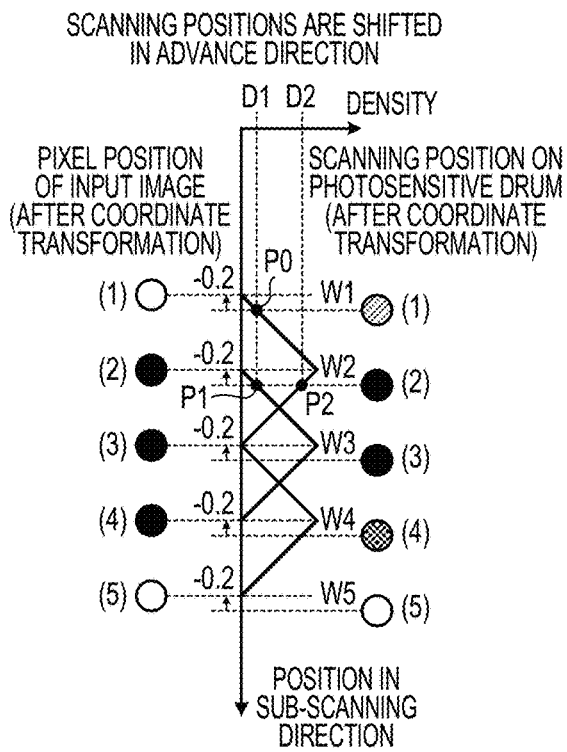
FIGS. 16A, 16B, 16C and 16D are each a diagram for illustrating the filtering for each classification of positional deviation according to the first embodiment.

FIG. 16A will be described first. The pixels (1) and (5) represented by white circles have a density of 0, that is, a pixel value of 0. Therefore, W1 and W5 obtained by multiplying a filter function by a pixel value are both 0. The pixels (2), (3), and (4) represented by black circles have the same density, and the maximum values of the waveforms W2, W3, and W4 are the same. Thus, the pixels (2), (3), and (4) each result in a waveform obtained by developing the filter function based on the pixel position of the input pixel. The result of the convolution operation is a sum (ΣWn, n=1 to 5) of all the waveforms.

Figure 16B:
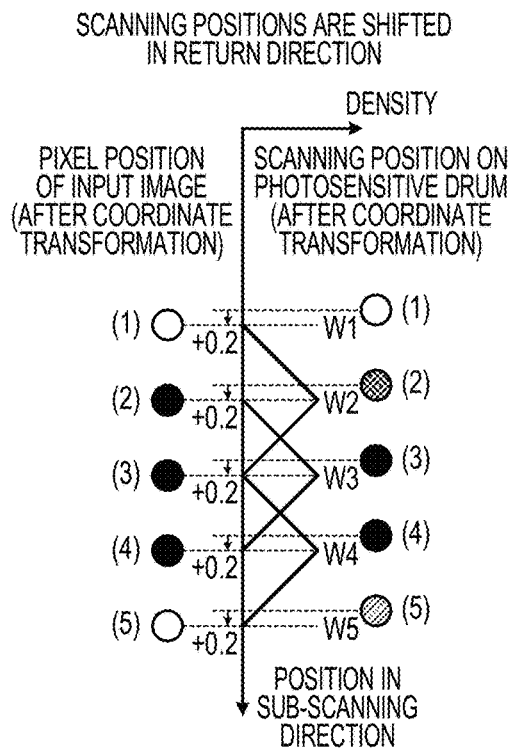
Figure 16C:
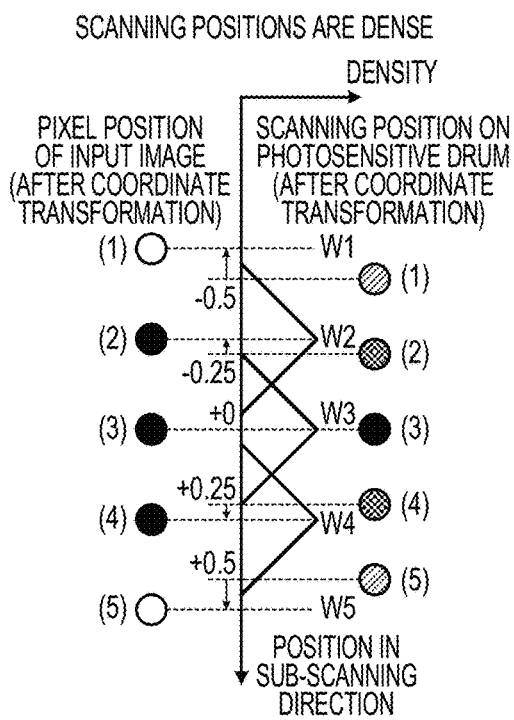
Figure 16D:
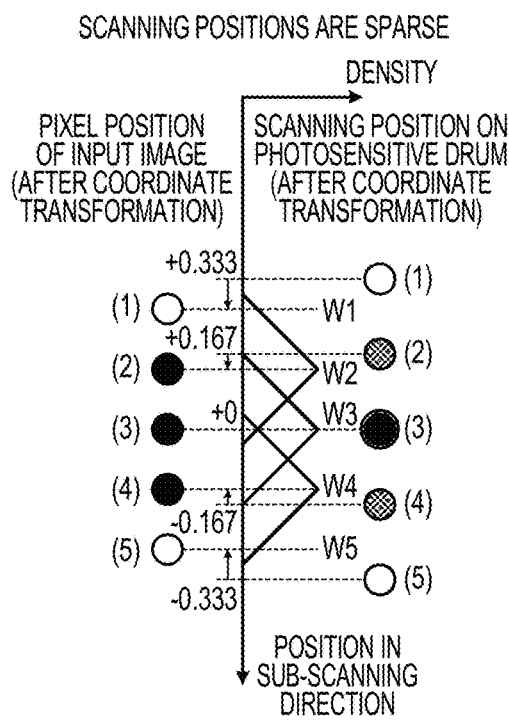

A pixel value of an output pixel is sampled at the scanning position on the photosensitive drum 102 after the scanning position is subjected to the coordinate transformation. Therefore, for example, the pixel value (1) corresponding to the scanning position on the photosensitive drum 102 intersects with the waveform W2 at a point P0, and hence is calculated to be density D1. Further, the pixel value (2) intersects with the waveform W2 at a point P2 and the waveform W3 at a point P1, respectively, and hence is calculated to be density D1+D2. The pixel values (3) to (5) are subsequently determined in a similar manner. The pixel value (5) does not intersect with any waveform, and hence the pixel value thereof is set to 0. Further, the result obtained by calculating the pixel values (1) to (5) of FIG. 16B to FIG. 16D are represented by shading of pixels in each column on the right side.

The positional deviation of the input pixels is illustrated so as to correspond to each pixel on the vertical axis of FIG.

16A to FIG. 16D. The positional deviation amount represented by the vertical axis of FIG. 16A to FIG. 16D is information on the positional deviation amount determined by an inverse function in accordance with the coordinate transformation of the scanning positions in the sub-scanning direction of the pixels of the input image. For example, in the case of FIG. 16A, as described with reference to FIG. 12A, the correction amount C of the positional deviation amount S of the scanning lines is −0.2. Further, for example, in the cases of FIG. 16C and FIG. 16D, the correction amounts C are calculated with the use of Expressions (22) and (23), respectively.

FIG. 16A is an illustration of a state in which the scanning positions of the scanning lines are shifted in the advance direction in the sub-scanning direction, but the centers of gravity of the pixel values are shifted in the return direction, and hence the positions of the centers of gravity of the pixel values are corrected. FIG. 16B is an illustration of a state in which the scanning positions of the scanning lines are shifted in the return direction in the sub-scanning direction, but the centers of gravity of the pixel values are shifted in the advance direction, and hence the positions of the centers of gravity of the pixel values are corrected. FIG. 16C is the case in which the intervals between the scanning positions are dense, and is an illustration of a state in which the distribution of density is widened due to the convolution operation after the coordinate transformation to cancel the local concentration of density, to thereby correct a local change in density. Further, FIG. 16D is the case in which the intervals between the scanning positions are sparse, and is an illustration of a state in which the distribution of density is narrowed due to the convolution operation after the coordinate transformation to cancel the dispersion of density, to thereby correct a local change in density. In particular, the pixel value (3) of FIG. 16D is a density of (100+α) % that is higher than 100%.

(Filtering)

Figure 17:
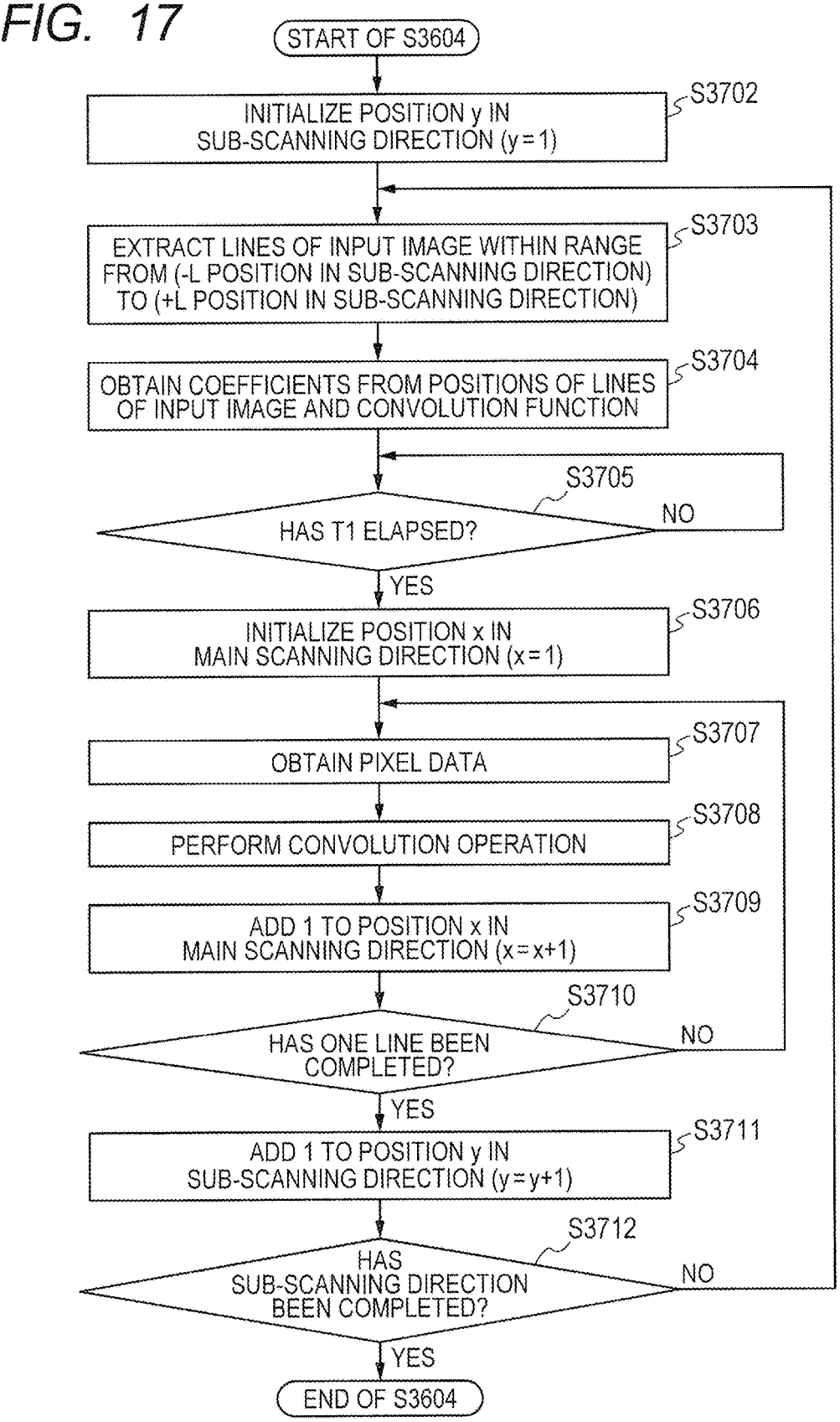
FIG. 17 is a flowchart for illustrating the filtering according to the first embodiment.

Referring back to FIG. 10, in Step S3604 of FIG. 10, the CPU 303 performs the filtering with the filtering portion 501 based on the attribute information for correction generated in Step S3603. Specifically, the CPU 303 performs a convolution operation and re-sampling with respect to the above-mentioned input image. The processing of Step S3604 performed by the CPU 303 will be described below in detail with reference to the flowchart of FIG. 17. When the CPU 303 starts the filtering through the convolution operation with the filtering portion 501, the CPU 303 performs the processing in Step S3702 and subsequent steps. In Step S3702, the CPU 303 initializes the position "y" in the sub-scanning direction (sets the position "y" to 1). In Step S3703, when the spread of the convolution function is defined as L, the CPU 303 extracts lines of an input image within a range of before and after ±L of the sub-scanning position of a line "yn" (position "yn") of an output image of interest, that is, the range of a width of 2L (range of from (ys−L) to (ys+L)). In this case, L is defined as a minimum value at which the value of the convolution function becomes 0 outside of the range of from +L to −L of the convolution function. For example, in the linear interpolation of FIG. 15A, L is equal to 1. In the bicubic interpolation of FIG. 15B, L is equal to 2. In the bicubic interpolation of FIG. 15C, L is equal to 3. The ymin and ymax within a range of from ymin to ymax of the corresponding input image satisfy the following condition with the use of Expression (19).

$$ft^{-1}(y\min)=yn-L,\ ft^{-1}(y\max)=yn+L \qquad \text{Expression (27)}$$

When Expression (27) is modified, the ymin and ymax are determined by Expression (28).

$$y\min=ft(yn-L),\ y\max=ft(yn+L) \qquad \text{Expression (28)}$$

Thus, the lines of the input image to be extracted with respect to the line "yn" of the output image of interest are lines of all the integers within a range of from ymin to ymax.

When the line of the output image of interest is denoted by "yn", and the line of the input image to be subjected to the convolution operation is denoted by "ym", a distance "dnm" is represented by Expression (29).

$$dnm=yn-ft^{-1}(ym) \qquad \text{Expression (29)}$$

Thus, in Step S3704, the CPU 303 obtains a coefficient "knm" as a convolution function g(y) with the filter coefficient setting portion 504 by Expression (30).

$$knm=g(dnm) \qquad \text{Expression (30)}$$

In Step S3705, the CPU 303 refers to the built-in timer which has been started when the BD signal has been received, to thereby determine whether or not a period of time T1 has elapsed. In this case, the period of time T1 is a period of time from timing at which the BD signal is output to timing at which the laser beam reaches the leading edge of the image area in the main scanning direction of the photosensitive drum 102. In Step S3705, when the CPU 303 determines that the period of time T1 has not elapsed, the CPU 303 returns to the processing in Step S3705. When the CPU 303 determines that the period of time T1 has elapsed, the CPU 303 proceeds to the processing in Step S3706. In Step S3706, the CPU 303 initializes the position "x" in the main scanning direction (sets the position "x" to 1). In Step S3707, the CPU 303 obtains pixel data on the position in the sub-scanning direction in the input image extracted in Step S3703 and the position "x" of interest in the main scanning direction. The pixel data is defined as input pixel data $Pin_m$.

In Step S3708, the CPU 303 performs the convolution operation with the filtering portion 501. More specifically, the filtering portion 501 subjects the corresponding coefficient knm determined in Step S3704 and the input pixel data $Pin_m$ obtained in S3707 to a product-sum operation, to thereby determine a value $Pout_n$ of the pixel of interest. The input pixel data $Pin_m$ is density of the pixel of interest before the filtering, and the value $Pout_n$ of the pixel of interest is output pixel data and is density of the pixel of interest after the filtering.

$$Pout_n = \sum_m^{all} k_{nm} \cdot Pin_m \qquad \text{Expression (31)}$$

Expression (31) corresponds to FIG. 16A to FIG. 16D. The darkness (density) of the circles on the left side in FIG. 16A to FIG. 16D corresponds to the input pixel data $Pin_m$. D1 and D2 in FIG. 16A correspond to $knm \times Pin_m$. The darkness (density) of the circles on the right side in FIG. 16A to FIG. 16D corresponds to $Pout_n$.

In Step S3709, the CPU 303 adds 1 to the position "x" in the main scanning direction. In Step S3710, the CPU 303 determines whether or not one line has been completed, that is, whether or not the scanning has reached the last pixel in one line. When the CPU 303 determines that one line has not been completed, the CPU 303 returns to the processing in Step S3707. When the CPU 303 determines that one line has been completed, the CPU 303 proceeds to the processing in Step S3711. In Step S3711, the CPU 303 adds 1 to the position "y" in the sub-scanning direction. In Step S3712, the CPU 303 determines whether or not all the lines in the sub-scanning direction have been completed, that is, whether or not the last line of one page has been reached. When the CPU 303 determines that one page has not been completed, the CPU 303 returns to the processing in Step S3703. When the CPU 303 determines that one page has been completed, the CPU 303 terminates the filtering.

Thus, in the embodiment, distortion and uneven image density of an image caused by the deviation of an irradiation position due to a variation in arrangement intervals of light emission points of a laser light source and the optical face tangle error of the mirror faces of the rotary polygon mirror 204 are corrected by subjecting a pixel position of an input image to the coordinate transformation based on a profile of positional deviation in the sub-scanning direction of the input image. Then, the filtering and sampling are performed, thereby being capable of cancelling positional deviation and local biased density such as banding while maintaining the density of each input image, with the result that a satisfactory image can be obtained.

As described above, according to the embodiment, an image with stable quality can be formed by performing appropriate correction even when a tone change due to a change with time and environmental fluctuations occurs. In the embodiment, when degradation in performance of optical face tangle error correction caused by a change in the development γ is detected, the process proceeds to the adjusting processing for a correction amount of an optical face tangle error described with reference to FIG. 8, and the correction amount and phase amount for correcting a change in the development γ are updated to an optimum correction amount and phase amount, to thereby maintain correction performance.

Second Embodiment

Adjusting Processing for Correction Amount of Optical Face Tangle Error

The basic configuration of the second embodiment is the same as that of the first embodiment, and the second embodiment is different from the first embodiment in adjusting processing for a correction amount of an optical face tangle error in Step S611 of FIG. 5. Therefore, the description of the configurations except for that of Step S611 of FIG. 5 is omitted. In FIG. 8 of the first embodiment, when the feature amount of the extracted development γ falls outside of the predetermined range, a correction amount and a phase amount for adjusting a correction amount of an optical face tangle error are determined. In the first embodiment, a dither used in a predetermined area is not changed, and the positional deviation amounts Y1 to Y5 are adjusted based on the determined correction amount and phase amount. Meanwhile, in the embodiment, when the feature amount of the extracted development γ falls outside of the predetermined range, a predetermined dither used in a predetermined area is switched to another different dither.

Figure 18A:
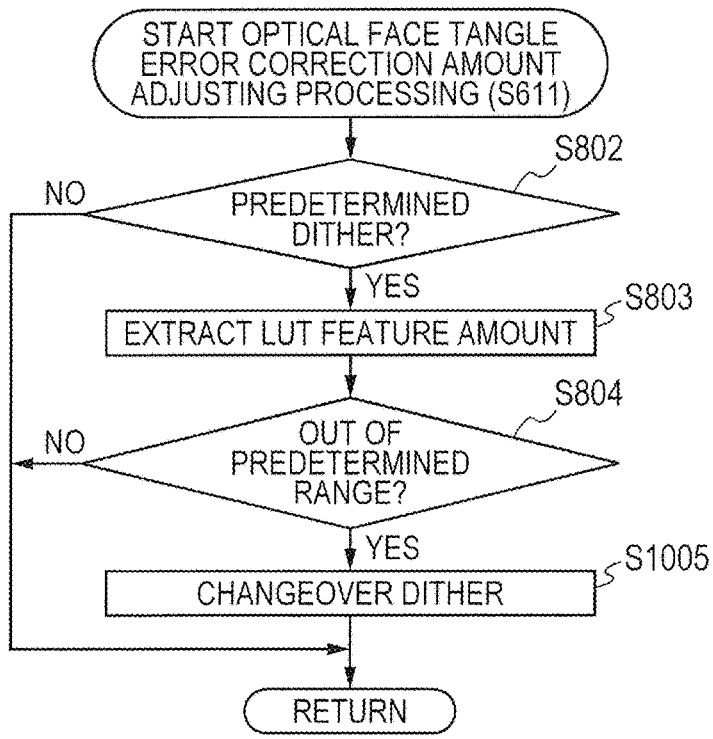
FIGS. 18A and 18B are flowcharts for illustrating adjusting processing for a correction amount of an optical face tangle error according to the second embodiment and the third embodiment.

FIG. 18A is a flowchart for illustrating adjusting processing for a correction amount of an optical face tangle error according to the embodiment. The same processing as the adjusting processing for a correction amount of an optical face tangle error of FIG. 8 is denoted by the same step numbers, and the description thereof is omitted. In Step S802, the dither suitable for extracting the feature amount of the development γ is the dither C as in the first embodiment. In the embodiment, when the CPU 303 determines in Step S804 that the feature amount of the toner correction table (LUT) extracted in Step S803 falls outside of the predetermined range, the CPU 303 proceeds to the processing in Step S1005. In Step S1005, the CPU 303 switches the dither used in a predetermined area from a predetermined dither (e.g., a dither A) to another dither (e.g., a dither B) and stores information for designating the switch of the dither in the RAM (not shown) or the like so that the subsequent processing is performed.

As described with reference to FIG. 19B and FIG. 19C, the line screen (dither A) illustrated in FIG. 19B is liable to be influenced by the optical face tangle error of the rotary polygon mirror 204 as compared to the dot screen (dither B) illustrated in FIG. 19C. In the embodiment, for example, even when the dither A is selected in the predetermined area of Step S702 of the page processing of FIG. 7, when the information for designating the switch of the dither is stored in the RAM (not shown) or the like, the dither A is switched to the dither B. Thus, in the embodiment, in the processing of Step S1005 of FIG. 18A, the CPU 303 designates the switch of the dither. When the dither A is selected in the processing of Step S1005, dither processing is performed with the dither B that is the dot screen which is less liable to be influenced by an optical face tangle error, rather than the line screen that is liable to be influenced by an optical face tangle error. In the subsequent page processing (Step S603 of FIG. 5), even when the dither A is selected in Step S703 as a result of the determination in Step S702 of FIG. 7, the CPU 303 performs control so that the dither A is switched to the dither B when the information for designating the switch of the dither is stored in the RAM (not shown) or the like.

As described above, according to the embodiment, an image with stable quality can be formed by performing appropriate correction even when a tone change due to a change with time and environmental fluctuations occurs. In the embodiment, when a decrease in performance of correction of the tone correction table (development γ, LUT) is detected, dither processing is performed with a dither (e.g., the dot screen) that is less influenced by an optical face tangle error instead of a dither (e.g., the line screen) that is greatly influenced by an optical face tangle error of the rotary polygon mirror. With this, moire caused by the optical face tangle error of the rotary polygon mirror can be controlled so as to be less noticeable.

Third Embodiment

The basic configuration of the third embodiment is the same as that of the first embodiment, and the third embodiment is different from the first embodiment in adjusting processing for a correction amount of an optical face tangle error in Step S611 of FIG. 5. Therefore, the description of the configuration except for that of Step S611 of FIG. 5 is omitted. In the first embodiment, when the feature amount of the development γ falls outside of the predetermined range, a correction amount for adjusting a correction amount of an optical face tangle error is determined, to thereby adjust the correction amount during optical face tangle error correction. Further, in the second embodiment, when the feature amount of the development γ falls outside of the predetermined range, a predetermined dither (e.g., the dither A) is switched to another dither (e.g., the dither B). In the embodiment, when the feature amount of the development γ falls outside of the predetermined range, an electrophotographic parameter (image forming condition) is changed.

(Adjusting Processing for Correction Amount of Optical Face Tangle Error)

Figure 18B:
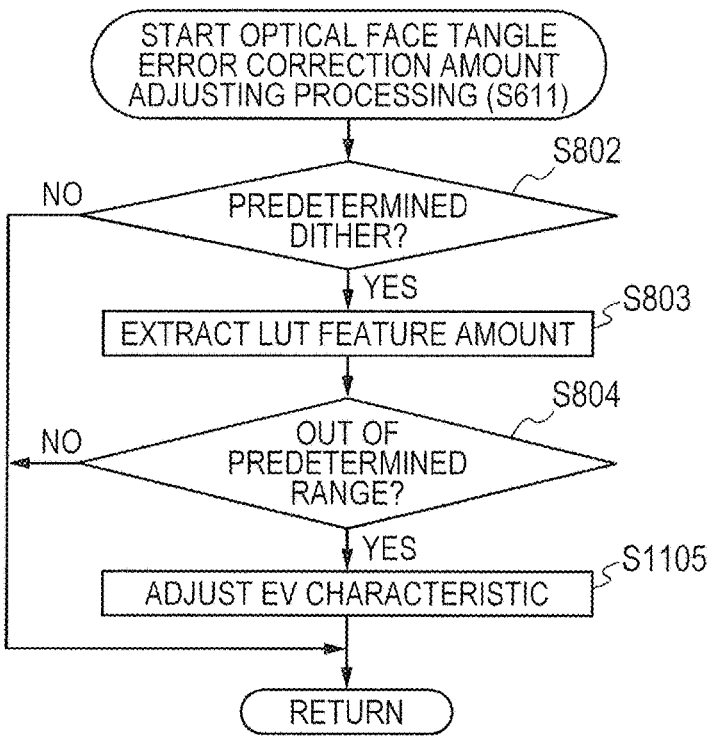

FIG. 18B is a flowchart for illustrating the adjusting processing for a correction amount of an optical face tangle error according to the embodiment. The same processing as that described with reference to FIG. 8 in the first embodiment is denoted by the same step numbers, and the description thereof is omitted. The dither suitable for extracting the feature amount of the development γ in Step S802 is the dither C as in the first embodiment. When the CPU 303 determines in Step S804 that the feature amount of the development γ extracted in Step S803 falls outside of the predetermined range, the CPU 303 proceeds to the processing in Step S1105. In Step S1105, the CPU 303 adjusts EV characteristics, to thereby adjust a change in the development γ. The EV characteristics are characteristics representing a relationship between the exposure amount (e[$\mu J/cm^2$]) from the laser light source 201 and the surface potential (v[V]) of the photosensitive drum 102. The CPU 303 adjusts, for example, the exposure amount of the laser light source 201 or adjusts a developing voltage, to thereby adjust a change in the development γ.

As described above, according to the embodiment, it is possible to form an image with stable quality by performing appropriate correction even when a tone change due to a change with time and environmental fluctuations occurs.

OTHER EMBODIMENTS

In the above-mentioned embodiment, the feature amount of the tone correction table (development γ, LUT) is extracted, and the correction amount is determined. Then, the dither is switched, and the EV characteristics are adjusted at the timing at which it is determined whether or not the feature amount falls within the predetermined range. However, for example, deterioration in correction performance of optical face tangle error correction may be displayed on a user interface (UI) such as an operation portion. Further, information on deterioration in correction performance of optical face tangle error correction may be stored in a memory so that maintenance for enhancing the correction performance is performed at timing of maintenance and inspection of the image forming apparatus. Further, in Step S606 of FIG. 5, an operation of updating the tone correction table (LUT) is performed when the number of sheets for image formation has reached a predetermined number or when the operation time of the image forming apparatus has reached a predetermined time, but an operation of updating the tone correction table (LUT) may be performed in accordance with a change in environmental conditions. In this case, the environmental conditions include, for example, temperature and humidity.

As described above, also according to other embodiments, it is possible to form an image with stable quality by performing appropriate correction even when a tone change due to a change with time and environmental fluctuations occurs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155194, filed Aug. 5, 2015, which is hereby incorporated by reference herein in its entirety.

What is claimed is:

1. An image forming apparatus, comprising:
a first processing unit configured to subject input image data to tone correction with use of a tone correction table;
a second processing unit configured to subject the image data subjected to the tone correction by the first processing unit to dither processing;
a correction unit configured to correct the image data subjected to the dither processing by the second processing unit with use of a correction amount based on positional deviation of scanning lines in a first direction caused by a mirror face tangle error of a deflection unit;
a light source comprising a plurality of light emitting points and configured to emit light beams based on the image data corrected by the correction unit;
a photosensitive member configured to rotate in the first direction so that a latent image is formed on the photosensitive member by the light beams emitted from the light source;
the deflection unit configured to deflect the light beams emitted from the light source with the mirror face and cause light spots of the light beams radiated on the photosensitive member to be moved in a second direction orthogonal to the first direction to form the scanning lines;
a developing unit configured to develop the latent image formed on the photosensitive member;
an extraction unit configured to extract a feature amount of the tone correction table to determine that tone characteristics have been changed; and
an adjustment unit configured to adjust a change in the tone characteristics by determining that the tone characteristics have been changed in a case where the feature amount extracted by the extraction unit exceeds a predetermined range.

2. An image forming apparatus according to claim 1, wherein the adjustment unit adjusts the positional deviation of the scanning lines in the first direction caused by the mirror face tangle error of the deflection unit based on an adjustment amount in the case where the feature amount extracted by the extraction unit exceeds the predetermined range.

3. An image forming apparatus according to claim 2, further comprising a detection unit configured to detect density of a toner image formed by the developing unit,
wherein the adjustment unit is configured to form a plurality of patches having a plurality of different adjustment amounts in the case where the feature amount extracted by the extraction unit exceeds the predetermined range, and determine one adjustment amount from the plurality of different adjustment amounts based on results obtained by detecting the plurality of patches with the detection unit.

4. An image forming apparatus according to claim 1, wherein the adjustment unit is configured to switch a predetermined dither to a dither different from the predetermined dither in the case where the feature amount extracted by the extraction unit exceeds the predetermined range.

5. An image forming apparatus according to claim 1, wherein the adjustment unit is configured to change an image forming condition of an electrophotographic process in the case where the feature amount extracted by the extraction unit exceeds the predetermined range.

6. An image forming apparatus according to claim 5, wherein the image forming condition comprises a light intensity of each of the plurality of light emitting points and a developing voltage for performing development with the developing unit.

7. An image forming apparatus according to claim 1, wherein the dither processing comprises a line screen, a dot screen, and error diffusion.

8. An image forming apparatus according to claim 7, wherein the extraction unit extracts the feature amount with use of the tone correction table of the error diffusion.

9. An image forming apparatus according to claim 8, wherein the extraction unit extracts the feature amount at a time when the tone correction table of the error diffusion is updated.

10. An image forming apparatus according to claim 8, wherein the feature amount is a standard deviation determined from a normal distribution obtained by normalizing differential values of the tone correction table.

11. An image forming apparatus according to claim 1, further comprising a storage unit configured to store information on the positional deviation of the scanning lines in the first direction,
wherein the correction unit is configured to convert positions of pixels of an input image by performing coordinate transformation based on the information stored in the storage unit so that an interval between the scanning lines on the photosensitive member becomes a predetermined interval, and perform filtering of determining pixel values of pixels of an output image by subjecting pixel values of the pixels of the input image to a convolution operation based on the positions of the pixels of the input image after the coordinate transformation.

12. An image forming apparatus according to claim 11, wherein the correction unit is configured to determine the positions of the pixels of the input image after the coordinate transformation with use of an inverse function $ft^{-1}(n)$ of a function $ft(n)$ by the following expression:

$$fs'(n)=ft'(ft^{-1}(fs(n)))$$

where:
fs(n) represents a function indicating a position of an n-th pixel in the first direction of the input image;
ft(n) represents a function indicating a position of the n-th pixel in the first direction of the output image;
fs'(n) represents a function indicating a position of the n-th pixel in the first direction of the input image after the coordinate transformation; and
ft'(n) represents a function indicating a position of the n-th pixel in the first direction of the output image after the coordinate transformation.

13. An image forming apparatus according to claim 12, wherein the correction unit determines, when the function fs(n) satisfies fs(n)=n and the function ft'(n) satisfies ft'(n)=n, the positions of the pixels of the input image after the coordinate transformation by the following expression:

$$fs'(n)=ft^{-1}(n).$$

14. An image forming apparatus according to claim 11, wherein the correction unit is configured to perform the convolution operation with use of linear interpolation or bicubic interpolation.

15. An image forming apparatus according to claim 11, wherein the pixel values comprise density values, and
wherein density values per predetermined area are stored before and after performing the convolution operation.

16. An image forming apparatus according to claim 11, wherein the correction unit is configured to define, when a width in the first direction within a range excluding 0 of a convolution function to be used for the convolution operation is defined as 2L, a range of from ymin to ymax of the pixels of the input image corresponding to a range of the width of 2L with a position "yn" of a predetermined pixel of the output image being a center as the following expressions:

$$y\min=ft(yn-L); \text{ and}$$

$$y\max=ft(yn+L).$$

17. An image forming apparatus according to claim 11, wherein the deflection unit comprises a rotary polygon mirror having a predetermined number of faces, and
wherein the information to be stored in the storage unit contains information on a variation in angle for each of the faces with respect to a rotary shaft of the rotary polygon mirror.

18. An image forming apparatus according to claim 11, wherein the predetermined interval is determined in accordance with a resolution of image formation by the image forming apparatus.

* * * * *